United States Patent [19]

Hoarty et al.

[11] Patent Number: 5,093,718
[45] Date of Patent: Mar. 3, 1992

[54] INTERACTIVE HOME INFORMATION SYSTEM

[75] Inventors: W. Leo Hoarty, Santa Clara, Calif.; Gary M. Lauder, New York, N.Y.

[73] Assignee: Inteletext Systems, Inc., Santa Clara, Calif.

[21] Appl. No.: 589,205

[22] Filed: Sep. 28, 1990

[51] Int. Cl.⁵ .......................... H04N 7/10; H04H 1/02
[52] U.S. Cl. .......................... 358/84; 358/86; 455/5; 455/6
[58] Field of Search .................. 455/2, 3, 4, 5, 6; 358/84, 86

[56] References Cited

U.S. PATENT DOCUMENTS

| | | |
|---|---|---|
| 4,071,697 | 1/1978 | Bushnell et al. |
| 4,077,006 | 2/1978 | Nicholson ............... 358/86 |
| 4,145,720 | 3/1979 | Weintraub et al. ............... 358/194 |
| 4,186,438 | 1/1980 | Benson et al. ............... 364/200 |
| 4,264,925 | 4/1981 | Freeman et al. ............... 358/86 |
| 4,450,477 | 5/1984 | Lovett ............... 358/86 |
| 4,533,948 | 8/1985 | McNamara et al. ............... 358/86 |
| 4,553,161 | 11/1985 | Citta ............... 455/5 |
| 4,633,462 | 12/1986 | Stifle ............... 455/5 |
| 4,695,880 | 9/1987 | Johnson et al. ............... 455/5 |
| 4,709,418 | 11/1987 | Fox et al. ............... 455/612 |
| 4,760,442 | 7/1988 | O'Connell et al. ............... 358/86 |
| 4,805,134 | 2/1989 | Calo et al. ............... 364/900 |
| 4,807,031 | 2/1989 | Broughton et al. ............... 358/142 |
| 4,829,558 | 5/1989 | Welsh ............... 455/2 |
| 4,901,367 | 2/1990 | Nicholson ............... 455/5 |
| 4,941,040 | 7/1990 | Pocock et al. ............... 358/86 |
| 4,961,211 | 10/1990 | Tsugane et al. ............... 455/5 |

OTHER PUBLICATIONS

T. Saadawi and M. Schwartz, "Distributed Switching for Data Transmission Over Two-Way CATV", *IEEE Journal on Selected Areas of Communications*, vol. 3, SAC-3, No. 2, pp. 323-329 Mar. 1985.

*Primary Examiner*—Reinhard J. Eisenzopf
*Assistant Examiner*—Lisa D. Charouel
*Attorney, Agent, or Firm*—Ostrolenk, Faber, Gerb & Soffen

[57] ABSTRACT

An interactive videotex system with distributed processing and storage of video picture information in nodes disposed throughout a cable television distribution system. The nodes are coupled to the feeder cable of the cable distribution system. Each node in the system receives a substantially identical copy of the interactive video picture information and related data from a regional processing center. The users at home televisions associated with a particular node interact directly with the video picture information in that node, rather than with the information stored in the regional processing center or some other remote location, which enables the system to quickly display photographic quality images and complex graphics, as well as sound, at the user's televisions in response to commands received by the users.

24 Claims, 19 Drawing Sheets

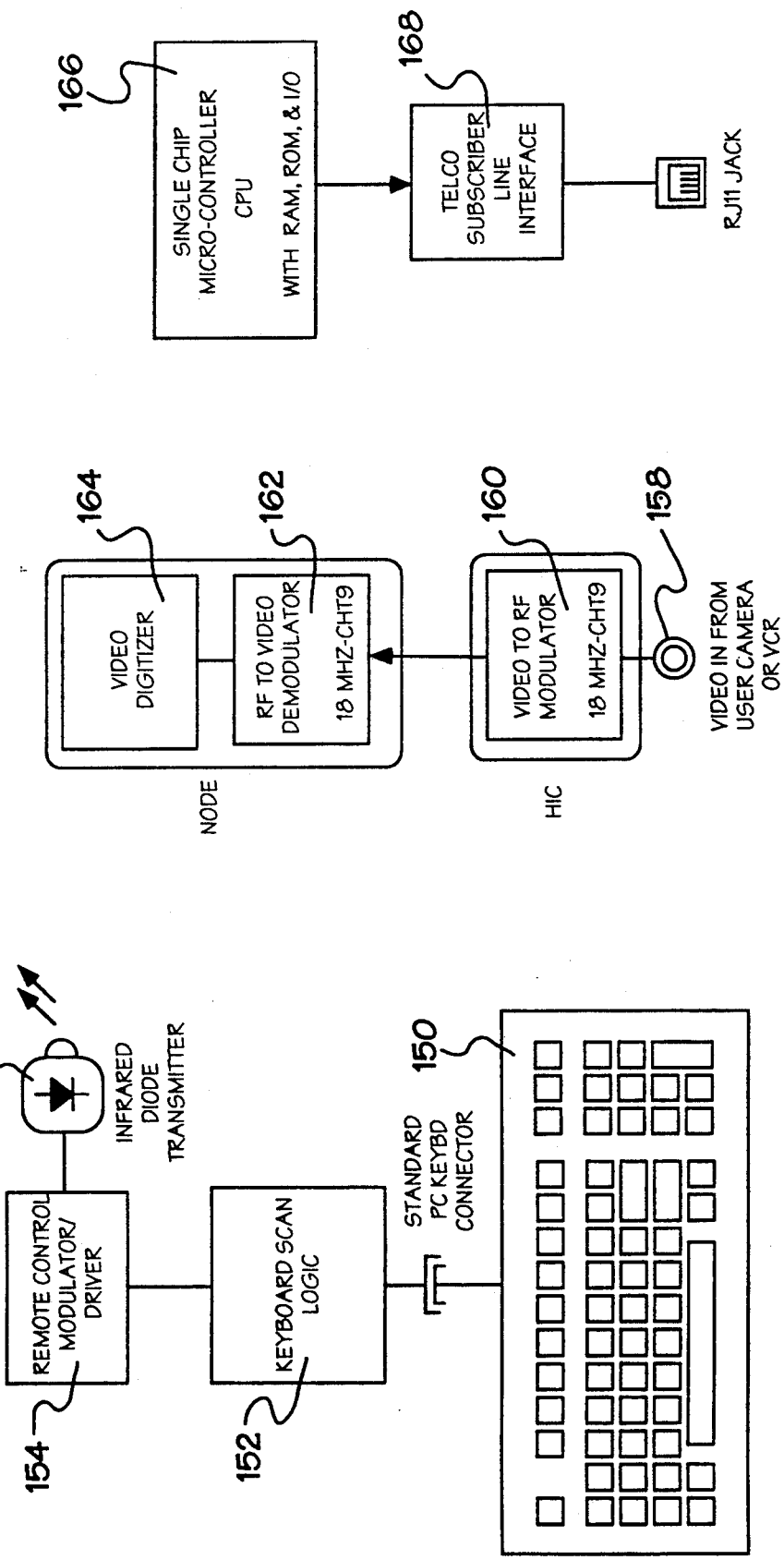

INTERACTIVE HOME INFORMATION SYSTEM

BACKGROUND OF THE INVENTION

1. Field of the Invention

The present invention relates to an interactive videotex system for supplying information to users in their homes and, more particularly, to an interactive videotex system with distributed information processing and storage which is hardwired to the user through existing cable television systems.

2. Description of the Related Art

Distributed processing and storage are relatively new concepts in data management and—because of the various technological hurdles—have not been considered until now for application to the field of videotex. The Prodigy® information service, which is now being marketed nationwide by Sears and IBM, claims to use a distributed database architecture. However, that system only distributes the database to regional mainframe computers. Their underlying technology—as with all other current videotex technology—still relies completely on the maintenance of continuous, real-time, two-way communication of a personal computer (or other terminal) in the home with a mainframe computer at some remote location. Nearly all videotex services use phone lines and modems to link the two, though some experiments with two-way cable TV and other media have been attempted. These existing systems have numerous limitations.

Since each user of a traditional videotex system is directly connected to a central mainframe when on-line, this central computer must be capable of simultaneously handling the many subscribers it gets during prime usage periods, while it may sit almost idle the rest of the time. As the number of users increases, additional large computers must be added to the system at great expense. Any problem with the central computer or the communications net linking it to the users can cause the entire system to cease functioning.

The speed with which information may be retrieved from such systems is limited to the speed with which the central computer can recognize the users' requests and locate the information in its central data storage media. Even the largest and fastest of central computers cannot overcome the severe limitations of how quickly information may be carried by the phone lines or other media that connect it to the user. Phone lines have a narrow bandwidth and can carry only a limited amount of information at any one time. For example, it takes 8 to 10 seconds for a central computer to send a screen full of just text information to a user terminal over a telephone line, assuming a typical communications speed of 2400 baud. A complex graphic or photographic quality image could take at least ½ hour per image.

The newer Integrated Services Digital Network (ISDN) and fiber optic cable technologies will provide greater information transmission capability for businesses, but these technologies will not be wired into a large number of individual homes for at least another ten years. Moreover, even using high speed fiber optics connecting a central computer to a home terminal, the largest of computers cannot keep up with an entire city of users especially during prime time. As an example, the largest airline reservation system can only process 8000 transactions per second.

This bandwidth problem has never been adequately addressed by those working in the field because—until very recently—all computer interfaces were just character-based or used very low resolution alphamosaic style displays utilizing protocols such as NAPLPS or Teletel. While simple character-based information may be transmitted over phone lines relatively easily, the resulting display is difficult to interpret and use. Even simple alphamosaic displays take long enough—about 8 seconds—to transmit over a phone line that the level of interactively declines and, with the low quality of the display, the systems tend to become uninteresting and awkard to use. After the novelty wears off, the typical consumer finds that the difficulty of using such systems to obtain useful information, coupled with their slow speed and uninteresting graphics, makes other more traditional ways of obtaining information, i.e., printed information, more attractive.

Graphic user interfaces, particularly those using the high resolution, "photorealistic" displays are far more interesting and easier to use, but require vastly greater amounts of data to be transmitted in order to generate interesting screen images that will respond to the user's requests quickly. What has not been addressed by workers in the videotex field is that, while wide bandwidth transmission media remain very limited and/or expensive, the relative costs of memory media such as magnetic disk drives, dynamic random access chips (DRAMs) and other ways of storing data have been dropping quickly, as has the cost of fast microprocessors that can efficiently access and display data stored in the media. This suggests that a highly distributed architecture would overcome the bandwidth limitations and provide a cost effective and very fast information delivery system. The system of the present invention exploits these ongoing technological changes and thus overcomes the above-noted problems in the videotex field.

SUMMARY OF THE INVENTION

The present invention, unlike prior art systems, provides easy-to-understand photographic quality images and fluid movie-credit-like scrolling of text and graphics, accompanied by sound (speech and music). This is possible only because the data needed by the user of the present invention is stored locally in the memory of the processing module or node that is serving the individual home or small group of homes over the existing broadband media of the coaxial TV cable drop that goes into each household and directly to the television set. Because each local node can handle all of the households attached to it, and since it is independent of any central computer except for daily updates, the system is also very reliable and economically scalable. Whether two households or two hundred thousand households use the system simultaneously will not impact performance, and the system will continue to work and provide information to end users even if the source of updates, usually from the central processing computer, is shut down for quite some time.

Briefly, the system of the present invention includes:
a regional processing center for assembling and processing the videotex information to be transmitted over the television cable distribution system; and
at least one node coupled to the cable television distribution system for capturing and storing the processed and assembled videotex information, the node being associated with at least one of the home televisions.

Preferably, many cable television subscribers share the videotex information stored in a node. A subscriber can display and interact with the videotex information stored in the associated node by communicating commands to the node. Since each of the nodes in the cable television distribution system contains a substantially identical copy of the videotex information transmitted by the regional processing center, the subscriber interacts directly with the videotex information stored in the node, and not with the videotex information stored in the regional processing center.

Each of the nodes in the system is coupled to a feeder cable of the cable television distribution system at a location immediately after the cable line extender amplifier (approximately every quarter mile). Typically, there are from one to ten taps of four or more outputs each between any two line extender amplifiers on a feeder cable, all of which are served by one node in the present invention. The nodes transmit the videotex information to the home televisions at television channel frequencies unused by the cable distribution system for transmitting ordinary cable television programming. These frequencies are typically above the last used cable TV channel.

Feeder inserters are used to connect the nodes to the feeder cable. The feeder inserters include a low pass filter for blocking videotex information from any upstream nodes, while permitting the video frequencies used by the cable system for ordinary cable television programming to pass through downstream unattenuated.

The nodes output the videotex information to their associated home televisions over a plurality of frequency channels. A home interface controller coupled to each home television receives and descrambles a channel from the node, preferably on the next available frequency channel (on a contention basis). The home interface controller communicates back to the node on a low band frequency on a polled basis. In this contention embodiment, each of the home interface controllers contains electronics which unscrambles only the channel assigned to it for viewing by the user. In other embodiments of the invention, the controllers communicate with their associated node on a noncontention basis.

As mentioned above, the user retrieves selected videotex information by sending commands back to the node. These commands travel to the node over a return path using the existing cable television wire, just as the videotex information itself sent from the node to the home televisions travel over the existing cable TV wire.

Preferably, users of the system are provided with a remote control touch pad device, available with or without a full typewriter style keyboard, for inputting user commands into the home interface controller coupled to their television. Alternately, or in addition, the home interface controllers are adapted to receive user commands from a conventional PC keyboard, via an infrared interface attached to the keyboard.

Yet another option is to provide users with printers for printing hard copies of information received from the node, including tickets to entertainment events or coupons for merchandise discounts, etc.

Preferably, the system is configured to allow user responses to be transmitted from the subscriber terminals to a selected merchant. The user responses return to the selected merchants after passing up the subscriber cable to the node, then via a telephone line attached to the node (or the upstream nodes send user responses downstream to an end node, which has the telephone line). Optionally, as an added convenience, an autodialer device may be provided to dial the telephone of the user to allow the user to speak directly to a system advertiser, for example the seller of an item described in a classified ad on the system.

The importance of the present invention to the electronic information distribution and videotex industries is that it can deliver photographic quality images, with sound, to millions of homes simultaneously. The system can meet peek demand periods, and most importantly, can deliver information with a look and feel equivalent to what the home viewer has come to expect from network television, i.e., interesting colorful 3-D graphics, photographic quality images and smoothly rendered text. This contrasts to existing systems with limited graphics that look like video games and have jagged, poorly rendered text. Prior art videotex systems could not do more, or look better, without adopting the approach outlined in this summary, and set forth in greater detail below.

BRIEF DESCRIPTION OF THE DRAWINGS

These and other features and advantages of the present invention will become apparent when the following text is read in conjunction with the accompanying drawings in which:

FIGS. 16-18 illustrate, respectively, an optional PC keyboard interface, a home interface controller telephone interface, and video input electronics for inputting user-created video to create classified ads.

DETAILED DESCRIPTION OF THE PREFERRED EMBODIMENTS

I. SYSTEM OVERVIEW

The present invention is a distributed computer system that offers a variety of consumer-oriented information and advertisement sources. The user interacts with the system using a remote control device and views the system output on an unmodified home television set as just another TV channel.

A small home interface controller containing a remote control receiver sits atop the TV set and is connected to the cable TV wiring in series with the user's television. This unit transmits user remote control actions back up the subscriber cable TV drop to a local computer—called a node—which is wired to the cable line outside the home.

The node computer directly interacts with the user and has stored, on an internal storage medium such as a hard disk, a complete copy of all data of the entire system. This node computer is complete in all respects and does not have to refer back to a central computer to complete user information requests. The node computers are placed throughout the cable system on poles, underground, or in apartment building basements and each serves about 40 homes apiece.

II. DATA FLOW THROUGH THE SYSTEM

Figure 1:
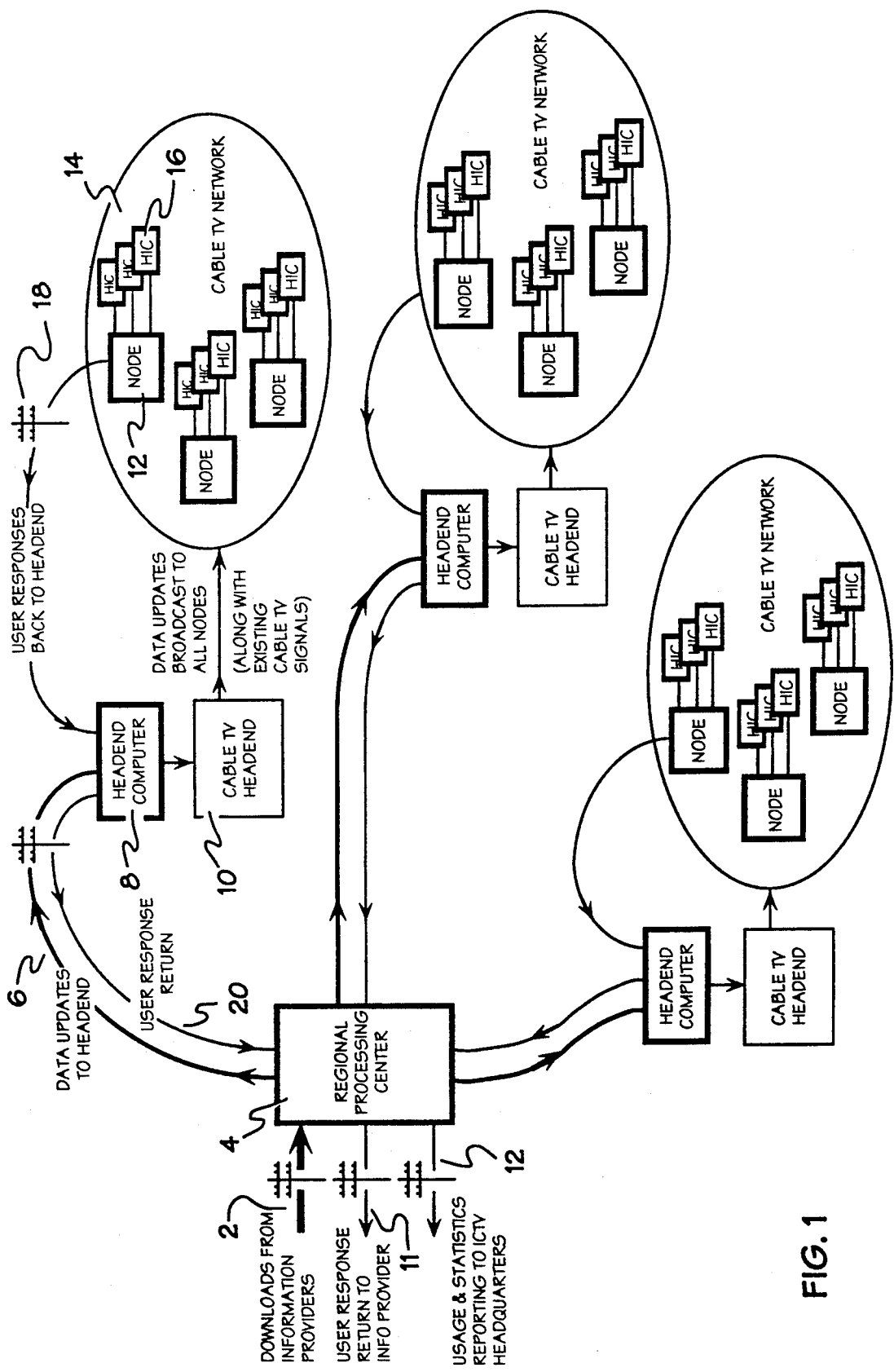
FIG. 1 illustrates the regional network architecture of the invention, where a regional facility receives and preprocesses data for all the cities in the region and distributes the preprocessed data to respective cable TV systems, and where the data is in turn broadcast to nodes for access by individual home interface controllers.

Referring now to the drawings, where like reference numbers indicate like elements, and specifically referring first to FIG. 1, data for the system originates from various contracted information providers or service providers. Data from these providers is received via computer modem over telephone lines 2 by regional processing center 4. Advertisements and information listings, such as classified ads and TV listings, come into the regional center 4 throughout the day. This information is processed and customized into data "magazines" for each cable system. A processed data magazine is ready to go by the next morning and is transmitted via computer modem over telephone lines 6 to a computer 8 placed in the headend 10 of the target cable system.

The headend computer 8 acts as a store and forward device to receive this data and rebroadcast it to all of the nodes 12 throughout the cable system 14. The headend computer 8 transmits the data updates at a preferred data rate of 9600 bps or greater. The entire set of updates is transmitted repeatedly until the next day. This ensures that random noise induced data errors not corrected by the block error correction codes are corrected on the next pass of the data set.

It should be noted that since the headend computer 8 acts merely as a buffer, it is not a required element of the system; i.e., the system could operate with the data being sent from regional processing center 4 directly to the nodes 12. However, the headend computer 8 is included in the preferred embodiment of the invention since it provides an extra level of backup storage in event of a failure of a regional processing center.

The home user interacts with the system using a infrared remote control device. The remote control signal is received by a set-top unit called a home interface controller (HIC) 16. HIC 16 sends the user commands received from the remote control back up the cable drop to node 12 outside the home.

Some of the information and services carried on the system offer interactive sessions with the user, such as purchasing tickets for the theater, music or sports events, as well as home shopping opportunities. The user's choices are relayed from the node 12 along the feeder cable to the last downstream node (the "end node"), and from there back to the headend computer 8 via a telephone line 18 connected to the end node. The headend computer 8 then relays user response packets back to the regional center 4 over telephone lines 20. The regional processing center 4 converts user response packets into a format expected by the particular service provider and relays the user data back to the respective provider via computer modem over telephone line 22.

III. INFORMATION CONTENT AND SYSTEM DATABASE

Typical information carried on the system includes: TV listings for a month in advance; classified ads; Yellow Pages type ads and listings, local restaurant guide; local entertainment listings; and miscellaneous information such as: current sports scores, financial news, traffic conditions, current weather radar image and forecasts.

The various sources of information and advertisements will originate in digitized video format for pictorial information, digitized sound for radio, and ASCII or EBCDIC text for textual information. Listings and advertisements will be transmitted to regional processing center 4 via computer modem from the supplier's computer (computer to computer link).

The regional processing center 4 converts and normalizes incoming digitized pictures, digitized sound and text into system standardized format. The normalized data is then moved into an object-oriented database. Each object in the database is made up of one or more of the following components: one or more digitized photographic or computer-graphic images (e.g. sequences of images for animation); digitized sound tracks; a hypertext-like script language (to define, based on user input, when and how to show images and play audio); textual information (such as body text of a classified ad or company address and hours of business); location coordinates of enterprise or business (used to compute distance of business from users home); and thesaurus entries (used to store associations between objects).

Once normalized and stored in the object database, the data are grouped by category (TV listings, classified ads, etc.). The grouped (categorized) data are then further processed to establish relevant associations or meaning amongst the data objects. The associations, where relevant, are added to the respective objects in the form of thesaurus entries so that the associations travel with the data object.

The hypertalk-like script language, mentioned above, is used to guide the user interface program in translating user commands from the remote control into actions on the user's TV screen. For example, these actions might include displaying an image and playing an audio track when the home user, using the remote control, positions an on-screen cursor on top of a particular icon, word, or other image and then presses the "PLAY" button on the remote control.

The data objects of the system database are advertisements in the form of layered information which allows a viewer to dig into the advertisement (like turning pages in a catalog) to reveal levels of information that interest the viewer. The layered advertisement is a video equivalent of a consumer brochure or catalog where the viewer can flip through at will to view relevant sections.

The data structure of the layered advertisements can be used for any type of information carried by the network. Adstack ™ can be text only, such as a simple classified ad for a used car, or could contain a picture of the used car for sale. The system can store and display in layered fashion. An Adstack ™ can be an entire catalog for a department store with hundreds of images and audio tracks in one object module. Alternatively, the system can store as an object module a list of information, such as a month of TV listings. If desired, that month of TV listings can contain selected images of actors of scenes from movies or TV shows that are displayed along with audio tracks when the viewer browses through the TV listings.

To summarize, the system utilizes a generalized storage methodology to package diverse kinds of information from audio/visual full-motion segments to static images to textual lists of information. The layered data structure presents a these diverse types of information, presenting a uniform structure to the decoding and display logic which the user interacts with.

Information and service providers, ad agencies, newspaper ad departments, etc. are supplied with video-graphics workstations based on popular personal computer technology. These workstations contain proprietary and commercial software to enable third parties to create finished, broadcast quality advertisements combining short full-motion segments, still images, and audio as desired. These advertisements can then be transmitted via modem to the regional processing center for preparation for inclusion on the system database.

IV. OVERVIEW OF THE DISTRIBUTED ARCHITECTURE OF THE SYSTEM

The regional processing center 4 is responsible for the processing and assembly of the complete sets of information (called magazines) for each cable system. Once the data is assembled and processed at the regional center 4, it is ready for viewing. The data needs only to be transferred to nodes 12 for access by the home users.

The nodes 12 are the end point of the distributed architecture of the system of the present invention. Each node 12 can serve up to about 60 homes on a contention basis (with an optional node extension module 124 discussed below), where up to 31 of the 60 homes can use the node independently and simultaneously. The home user interacts with node 12 layered data structure presents a.

The node 12 receives and stores on an internal mass storage medium all of the advertisement data broadcast by the headend computer 8. The daily broadcasts from the regional center to the computer 8 and then from the headend computer 8 to the nodes 12 consist only of changes to the node database. These changes consist of additions of new data, deletion of expired data, and changes to existing data. These updates will affect approximately 20 percent of the total database, for a given day, although the system is designed to accommodate 100% change every night.

The entire database that a user interacts with is local to the user. A full bandwidth TV channel is available from the node 12 to each home. A cable system may use a thousand or more nodes. This is in contrast with past and present videotex systems communicating over telephone lines with 1/1000 the bandwidth of a TV channel and a singular central computer to serve an entire city of tens of thousands or more.

V. SYSTEM INTERFACE TO CABLE TV SYSTEM

Figure 2:
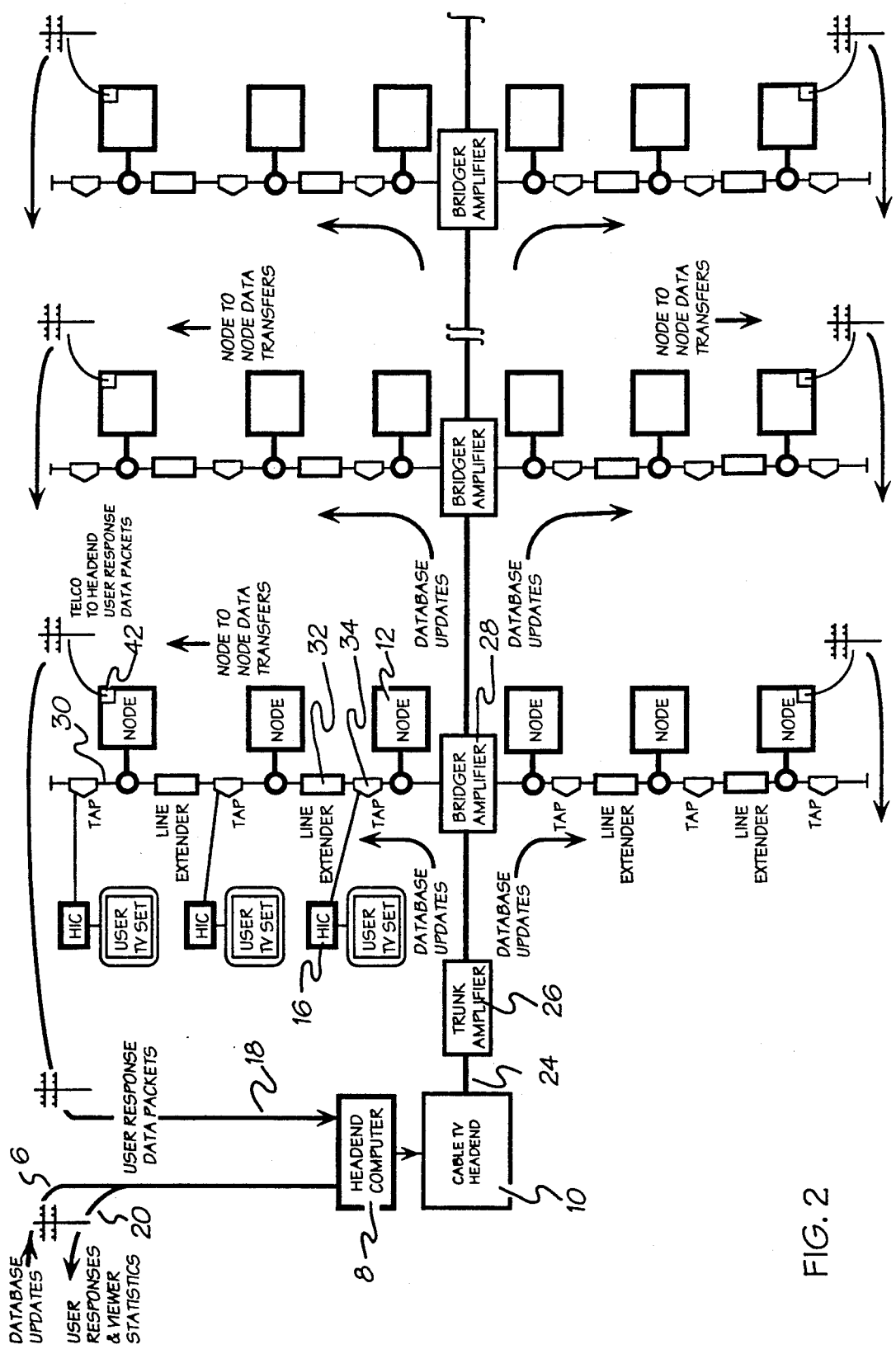
FIG. 2 illustrates the hardware of the present invention coupled to a typical cable TV system.

Referring to FIGS. 1 and 2, some ad objects are created at information suppliers and ad agencies offices on workstations. Data listings, such as TV listings, movie listings, and classified ads are imported from information providers via computer modem over telephone lines 2 into the regional processing center 4 and converted into the object modules.

Once normalized, object modules are grouped together for transmission to their respective cable TV system. The data magazine (group of advertisements) is transmitted over leased line 6 at a preferred data rate of 56 kbps (although the data rate can be anywhere between 2400 band to T1 (1.544 Mbs/sec). The headend computer 8 then rebroadcasts the data magazine at an appropriate data rate (preferably 9600 baud) across the cable system to all nodes 12 simultaneously to update the nodes' databases.

The headend computer 8 is preferably an industrial microprocessor-based controller computer with high capacity magnetic or optic read/wide storage devices. The output of the headend computer 8 is an rf carrier at 74 megahertz (between TV channels four and five). This carrier is modulated using a simple frequency shift key (FSK) technique, preferably at a data rate of 9600 bps.

The data modulated 74 mhz carrier is connected in the cable TV headend 10 to the existing cable TV plant through the rf combiner along with the regular cable TV channels. As in an ordinary or typical cable TV system, the output of the RF combiner connects to the trunk coaxial cable 24. The trunk 24 is a high quality coaxial cable that forms the backbone of the cable system. Trunk amplifiers 26 are placed every quarter mile to maintain signal strength. At cross streets or where needed, bridger amplifiers 28 split some signal off of the trunk to supply the feeder coaxial cable 30 which runs down residential streets.

Like the trunk cable 24, the feeder cable 30 has amplifiers, called line extenders 32, placed every quarter mile—which usually equates to every ten telephone poles. At every telephone pole, and sometimes midspan, taps 34 are spliced onto the feeder. Each tap 34 usually has from four to eight outputs to which subscriber drop cables 36 are attached. The subscriber drop 36 attaches to the home and then runs inside, terminating at the subscribers' TV sets 38. There are usually two line extender amplifiers per feeder cable, sometimes there are three amps, but rarely any more for signal quality reasons.

One node 12 is placed at the start of the feeder cable just after the bridger amplifier 28. Additional nodes 12 are placed after each line extender 32 along every feeder cable 30. As an example, for a large cable system of 100,000 homes with typically 2000 miles of cable feeder, there will be approximately 8000 line amplifiers. Such a system would correspondingly employ 8000 nodes.

The home user interacts with the system using an infrared remote control 40. The remote control signal is received by the Home Interface Control (HIC) 16 atop the user's TV set 38. HIC 16 is connected in series with the subscriber cable drop 36 (and cable converter box when used) and the user's TV 38. The user commands are relayed back up the subscriber cable drop 36 and through the tap 34 back to the node 12 on the pole nearby the home. This signaling, between HIC 16 and node 12, is done in the 5 to 50 MHz band, which is reserved by all cable system for return channel signaling.

The last node 42 on each feeder 30 has a telephone line 18 attached that is used by that node to send user responses back to the headend computer 8. All nodes along the feeder (usually two nodes) upstream from the end node 42 send their user responses to the end node 42 via an rf carrier at 74.5 MHz (between channels 4 and 5) at a preferred data rate of 9600 bps. To complete the loop, the headend computer 8 sends user responses back to the regional center 4 via datalink 20.

In summary, the system moves data updates across the cable system without using any cable TV channels by utilizing unused inter-channel space. The return path for interactive services is up the subscriber drop to the node at a low frequency, then downstream in inter-channel space along the feeder cable to the end of every feeder, then telephone lines back to the headend computer and telephone lines again to the regional computer center and telephone from there to the respective service provider. The aggregate delay from user back to service provider is no more than 5 seconds.

IV. BANDWIDTH UTILIZED BY THE SYSTEM

Figure 3:
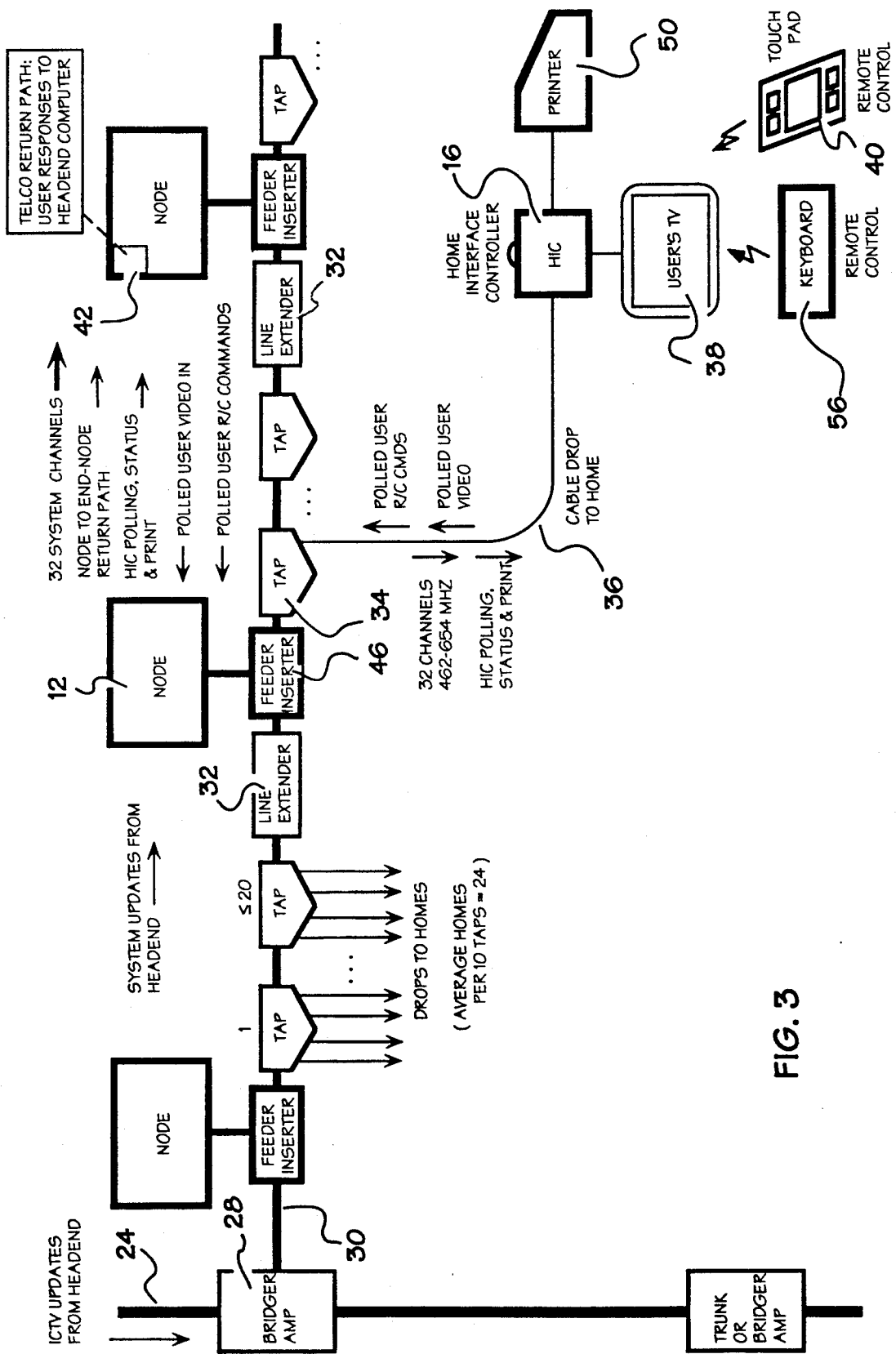
FIG. 3 illustrates a diagram showing the node of the present invention connected to a typical cable TV feeder and showing the connection of a node to a cable TV subscriber home.
Figure 4:
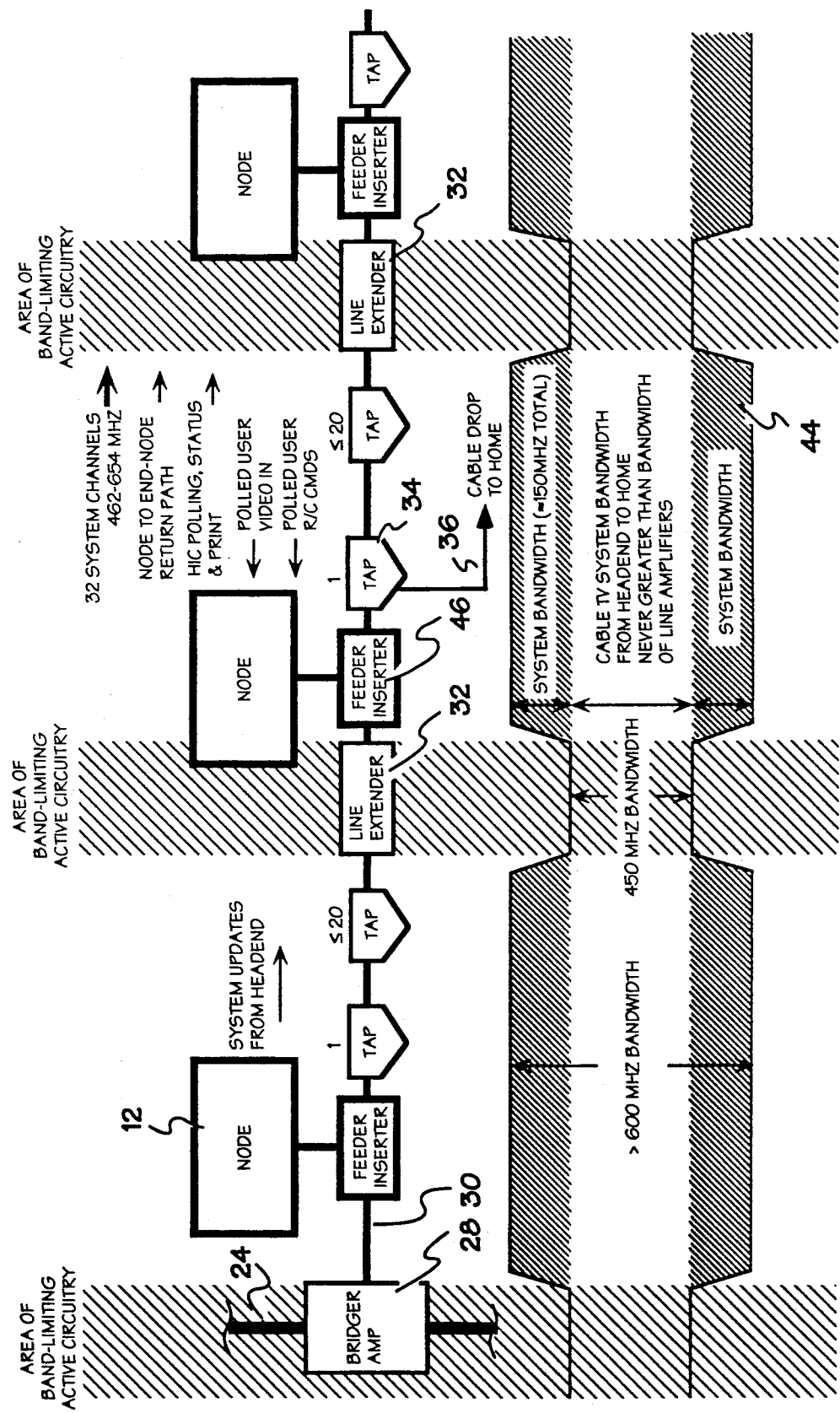
FIG. 4 is a diagram showing the bandwidth usage of the system on a typical TV system.
Figure 5:
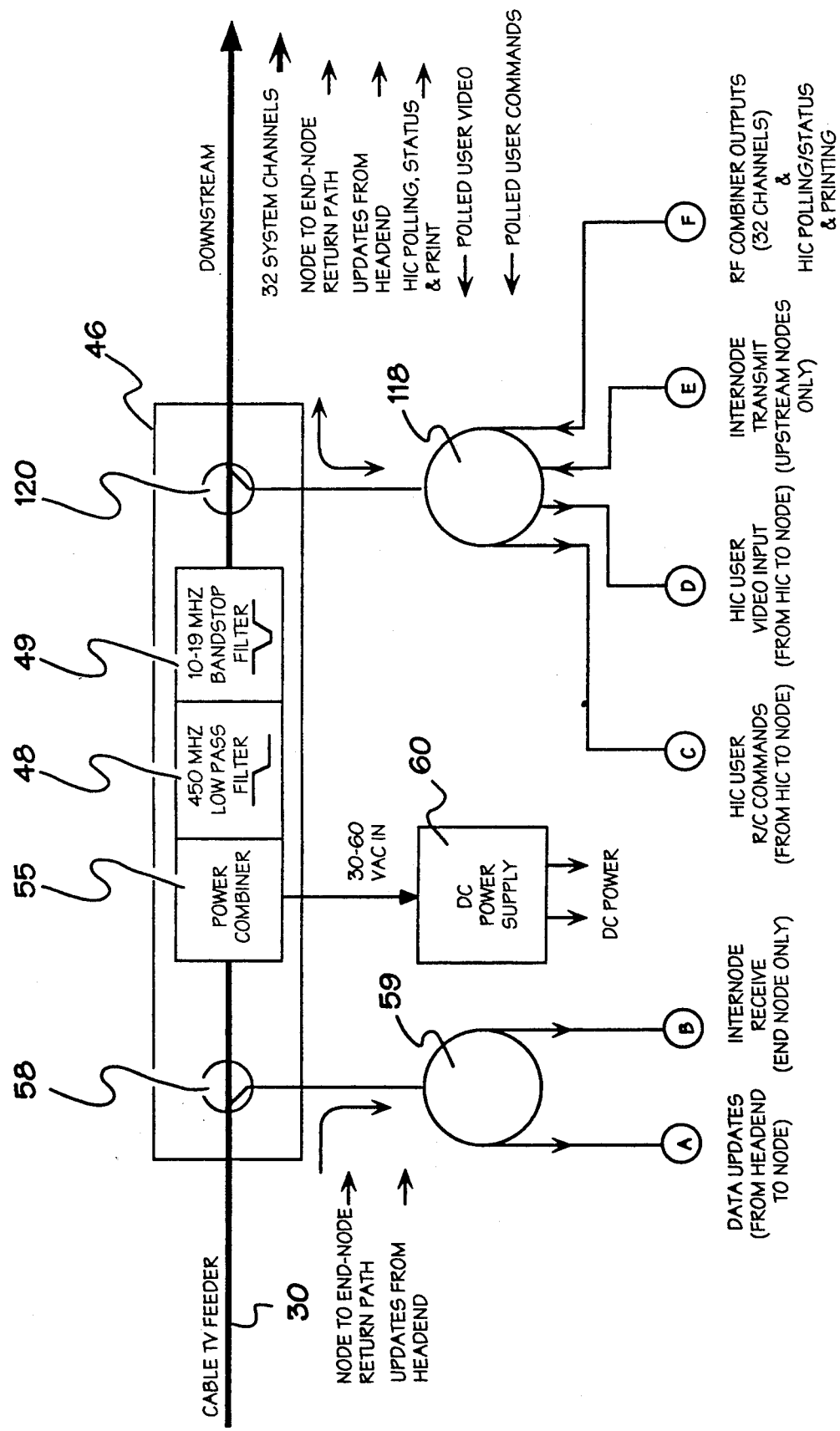
FIG. 5 is a schematic of a feeder inserter which is used to couple each node into the cable feeder.

Referring now to FIGS. 3, 4 and 5, each node 12 broadcasts on up to 32 standard TV channels. The 32 channels are broadcast as a block of adjacent channels above the last used channel of the cable system. For instance, if the cable system offers 50 channels of service, then the system of the present invention will use channels 51 to 82. The frequencies of 462 to 654 MHz would be used by the present invention on a 50 to 450 MHz cable system. If the cable system used 50 to 300 MHz bandwidth, the present invention would use 312 to 450 MHz, etc. These frequencies pass through the tap 34 and any splitters inside the home, but do not pass through the line extenders 32 or bridger trunk amps 28 unattenuated. These outband frequencies are unusable by the cable system from their headend because of the bandwidth limitation of the series of trunk and feeder amplifiers.

The shaded areas of FIG. 4 illustrate the bandwidth usage. The vertical grey bands passing through 28 and 32 represent areas of minimum bandwidth. For a typical cable system, as mentioned above, this bandwidth is 300 to 450 MHz. The node 12 exploits the unused bandwidth of the feeder cable 30, taps 34, and subscriber drop 36 to the home, which is a minimum of 600 MHz. This is represented by the horizontal hashed area 44. Each node 12 only services the taps up to the next line extender 32, which is usually less than twenty taps total and an average of thirty homes.

Some signals in the 462 to 654 MHz range from the nodes 12 will pass through line extenders 32, as the line extenders do not have a sharp cut-off at their top frequency—450 MHz in our example. To deal with this, the feeder inserter 46 contains a low pass filter 48 that sharply blocks the band above 450 MHz, so that the next node 12 can reuse the 462 to 654 MHz frequency range for the next group of taps up to the next line extender, and so on.

When a user presses a key on the infrared remote control 40, the HIC 16 receives the command and modulates it onto an 11 MHz carrier which is sent up the subscribe drop 36 through the tap 34, through the feeder inserter 46 and into the node 12. The feeder inserter 46 contains a notch filter 49 to block the 11 MHz carrier from going further upstream (left in the drawings) on two-way cable systems that have return path amplifiers (5 to 50 MHz) installed in the line extenders 32 and bridger amplifiers 28.

All HICs 16 signal back to their respective node 12 on an 11 MHz carrier. To avoid contention, the node 12 polls the HICs 16 on 12 MHz in a round-robin fashion. This HIC polling frequency also carries data for the printer 50 when the user chooses a selection on screen that allows printouts, such as store coupons or theater tickets. A third use of this 12 MHz carrier is for available channel status from the node 12 to the HICs 16. When the user first picks up the remote control 40 and touches any bottom, the HIC 16 reads this status word and selects the lowest channel available, if any. The HIC 16 then signals back to the node 12 on the 11 MHz carrier to reserve the channel.

Figure 6A:
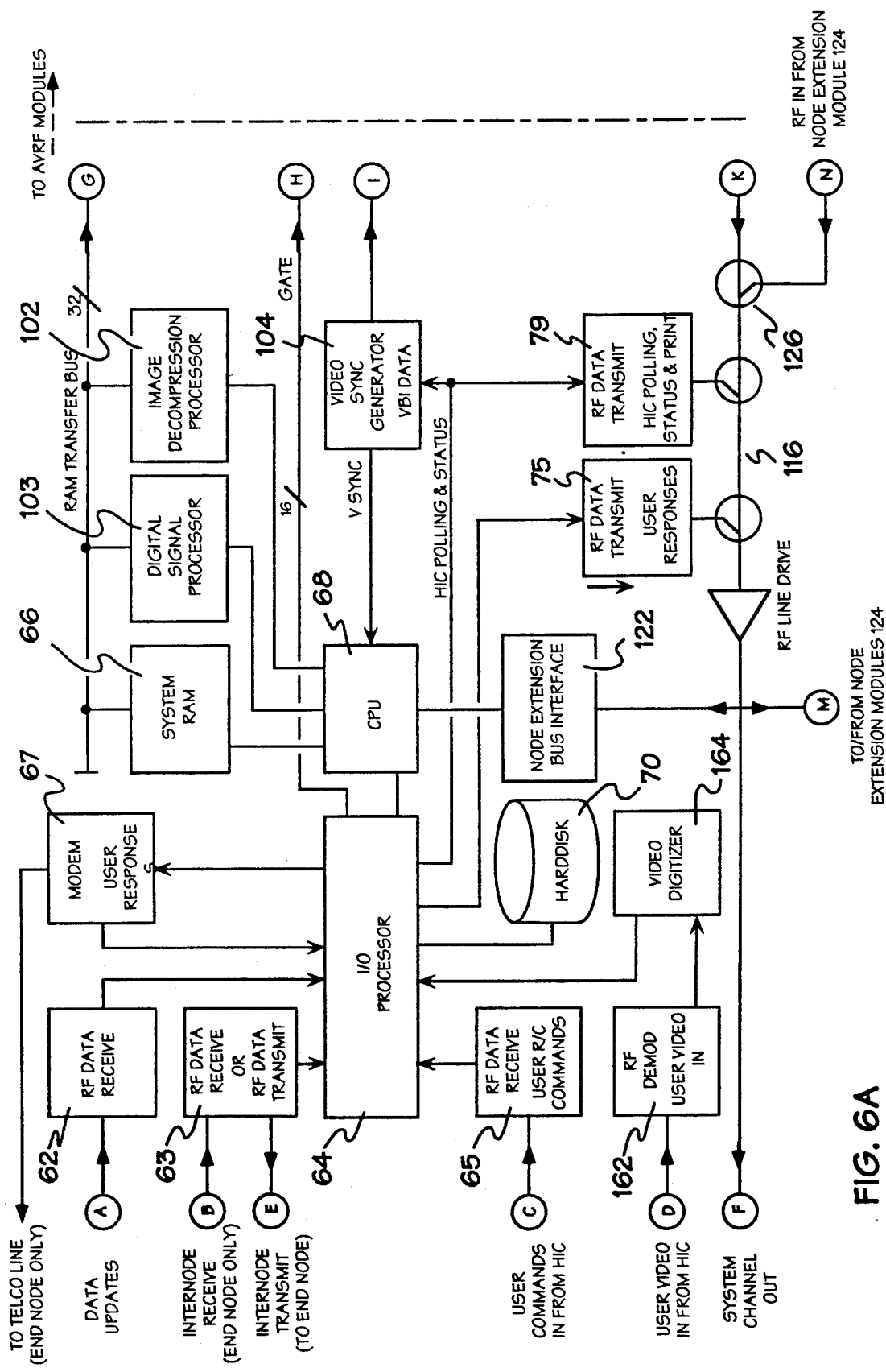
FIGS. 6A and 6B, collectively, represent a schematic diagram of a node.

For interactive services, such as home shopping or purchasing tickets, the user responses need to get back to the respective service provider. As mentioned above, the system supports two-way interactivity via a chain of store and forward nodes. Assume a user is interacting with the left-most node in FIG. 4. User responses are transmitted on a 11 MHz carrier from the HIC 16 and travel up the drop 36 to the node 12. The node 12 transfers the users response on a 74.5 MHz carrier to the last node 42 on the feeder cable 30. The end node 42 includes a modem 67 (FIG. 6A) and transfers user responses via telephone lines 18 to the headend computer 8, which relays the user responses to the regional center 4, which finally transfers the responses to the respective service provider. The total delay through the network will be less than five seconds from user to service provider.

VII. OVERVIEW OF THE NODE AND HIC

All but one of the channels of the system are interactive. These interactive channels are allocated on a first-come-first-served basis. All channels are scrambled and a channel can only be viewed by the home that it was allocated to. Once allocated, the channel is descrambled by the HIC 16 for each respective viewer. A system channel is assigned to one and only one home upon request (the user activates the remote control 40 to request a channel). The channel remains allocated until the user releases it or a certain number of minutes pass without any activity from the user.

Figure 6B:
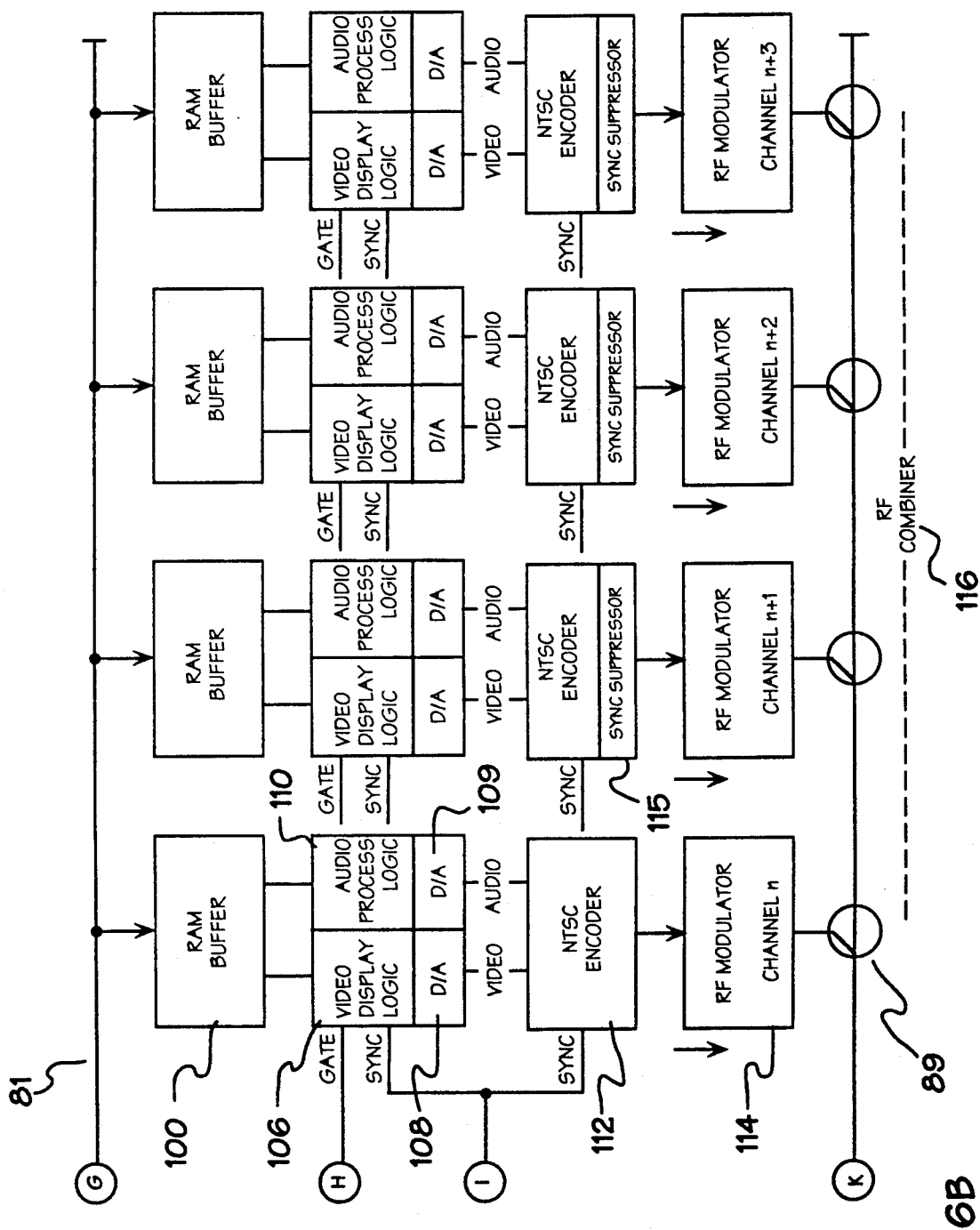

There are enough channels available for any particular node to allow for a 2 to 1 or greater contention. Audio/video rf modules (described later in connection with FIG. 6B) are inserted (4 channels per module) to populate a node for the desired contention level.

Once a system channel has been allocated to one of the approximately forty homes that can contend for it, the home user interacts with the node 12 in privacy. The channel is not viewable by other homes. To the user, the system is a dedicated channel to their TV set. The user interacts with the system using the remote control 40 to move an on-screen pointer over an icon, text, or image of choice and presses a button on the remote control 40 marked "PLAY" to select choices and call-up desired information.

When the user tunes to the system channel, the channel is displaying the latest TV listings. All subscribers on the cable TV system can see this service by just tuning to the cable television channel assigned to the system of the present invention. Upon tuning to this channel, the user sees the non-interactive channel of the system. If the user picks up the remote control 40 and touches any button, a request is sent to the node 12 for a dedicated system channel. The system then switches to one of the up to 31 dedicated interactive channels automatically (assuming one is available) and the user can begin to use the system, unaware of the channel change.

The change from the non-interactive display only channel to an interactive channel is effected by the home interface controller (HIC) 16 on top of the user's TV set 38. The home interface controller 16 monitors a 12 MHz FSK data stream from the node 12 modulated with a polling command to activate HIC 16 in a round-robin fashion. (An alternate embodiment uses the vertical blanking interval of the non-interactive channel to receive channel assignment and channel release commands from the node).

The home interface controller 16 includes channel converter electronics to switch any of the available interactive channels to the same channel as the non-interactive attract mode channel. The HIC 16 also contains an infrared receiver that receives commands from the remote control 40. The received commands are modulated onto an 11 megahertz carrier and sent up the cable from the home back to the node 12 outside.

The remote control device 40 (FIG. 15) is based on battery operated, standard infrared remote control technology. The remote control has a touch pad area 52 where the user presses a finger and causes a pointer cursor on the TV screen to move proportionately. The touch pad 52 is a wireless analog to a mechanical mouse as used by the Macintosh computers, among others.

The system preferably includes a thermal or ink jet printer 50 connected to the HIC 16, allowing the system to printout on demand hardcopy of information on the TV screen. The printer 50 can also print store coupons for special promotions. Another intended feature is for the printer 50 to print theater, sports and concert tickets encoded with a unique universal bar code. These bar-coded tickets can then be scanned at the theater or stadium for validation. Tickets of all kinds can be purchased over the system with the user entering a credit card number and PIN code on the TV screen.

To summarize, the system of the present invention is a distributed processing based system designed to provide a highly interactive and stimulating environment to the consumer. The system displays photographic quality images in both still frame and short full-motion segments and in both cases with synchronized audio. Because of the ability to display photographic-quality images, the system is not based on any graphics protocol such as NAPLPS or GKS, etc. The system transcends the video game-look of current and previous videotex system.

VIII. TECHNICAL DESCRIPTION OF NODE AND HIC

Referring now to FIGS. 5-8, data updates from the headend computer 8 are received off of the cable TV feeder cable 30 on a 74 MHz carrier through a directional coupler 58 and splitter 59. The data is demodulated by rf data receiver/demodulator 62 (at a preferred output data rate of 9600 bps) which feeds I/O processor 64. The I/O processor 64 transfers data to system RAM 66 which is then read by the CPU 68 and transferred to the local hard disk 70. (As shown in FIG. 5, DC power for the node is provided by a power supply 60 which is driven with AC power from the cable feeder via a power combiner 55).

The node control software places the received data into the system database and performs several indexing steps to knit the data into the existing database categories. These categories include product types, product names, company name, category that product or service belongs to etc. In addition, the database update items (data objects) contain the thesaurus entries that link the database entry (object) into a hierarchical thesaurus, establishing a network of meaning and associations amongst the data in the node database.

When a user tunes his or her TV to the system non-interactive channel (usually one channel higher than the highest channel used by the cable system), the user will see a non-interactive system channel showing the latest TV listings scrolling by on the TV screen. The user cannot interact with this image as the viewer is watching an attract mode only channel (system channel one at 462 MHz). All viewers on the cable TV system can see this channel simultaneously, whether they have a home interface controller 16 installed or not in their home. The home interface controller 16 has a trap 72 to block this channel, but the trap 72 is shunted by an rf switch 74 allowing the signal to pass until the user picks up the remote control 40 and presses any button. The r/c command from the user is received by an infrared receiver 76 mounted on the HIC box atop the TV set. This signal is demodulated by remote control receiver/demodulator 78 and passed to the HIC CPU 80.

The HIC CPU 80 starts the process of acquiring an interactive, dedicated system channel—so the user can interact with the system—by reading a status word from the data stream sent by the node 12 down the subscriber drop 36 on a 12 MHz carrier. This carrier is picked up off of the subscriber drop 36 through directional coupler 82 and through splitter/mixer 84. RF data receiver 86 detects and demodulates the signal into a serial data stream which feeds a CPU I/O port. The HIC CPU 80 reads the status byte and selects the lowest available interactive channel number (1 of 31). If all channels are busy, which should be a rare event, a red indicator 88 lights to indicate busy. The HIC CPU 80 will continue to watch the status word until a channel is available. When a channel is available and live, the HIC CPU 80 lights a green "ready" light 90. Assuming a channel is available, the node 12 will assign the channel to the requesting HIC 16. The HIC CPU 80 will address the assigned channel on the programmable channel tuner 92. The tuner 92 demodulates the channel from rf to video. However, none of the interactive channels are broadcast with video sync information and are, therefore, scrambled and unviewable on an ordinary TV set.

All 32 system channels are synchronized by the same video sync generator in the node 12. To reapply video sync to the interactive channels, the HIC 16 extracts sync from the attract mode channel. This is done by channel tuner 93, which is always tuned to non-interactive channel 1 at 462 MHz. The tuner 93 demodulates system channel 1 and passes the composite video signal to a NTSC sync extractor 94 which then provides sync to a NTSC sync adder 96, reconstituting the interactive channel to full composite video.

Once resync'd, the interactive channel video is modulated by rf modulator 98 to system channel 1's frequency (462 MHz). The CPU I/O causes RF shunt 74 to open, allowing the 462 MHz notch filter 72 to take effect, removing the attract mode channel. The inverse of this I/O command gates on the RF modulator 98, placing the interactive channel on the same frequency. To the user, nothing has happened, other than the screen having changed to the initial menu. The user may now interact with the system.

There are 31 interactive channels utilizing the spectrum from 468 to 654 MHz. These interactive channels are created from images and sound from an advertisement data object stored in RAM memory 100 in the node 12. The data object is placed in RAM 100 as the system determines the need to display information or images and play sounds. The data object to be displayed is called off of the hard disk 70 and placed in system RAM 66. The data object contains compressed video and audio components. The CPU 68 reads a compressed image out of RAM 66 and passes the image through the image decompressor 102. The output of the decompressor 102 is put in RAM 100. The same process is applied to audio tracks from an advertisement data object. As with the video component, the audio track is read off the disk 70 in a compressed form. The CPU passes the compressed audio to the digital signal processor (DSP) 102 for decompression and then passes the uncompressed digital audio to the RAM 100.

The video sync generator 104 drives the video display logic 106 which clocks the digital image out of memory and through a video digital to analog converter 108, producing an analog video waveform. The digitized audio track is clocked out of memory when required and applied to an audio digital to analog converter 109. The audio processing takes place in the audio processing logic section 110. The video and audio components are encoded in the NTSC encoder 112 to create a broadcast quality video signal applied to RF modulator 114. Although the NTSC sync generated in video synch generator 104 is combined with the video and audio components for timing purposes in order to perform proper NTSC encoding, the sync signal is thereafter suppressed from the interactive channels (i.e., all channels except for channel 1) by sync suppressors 115. As mentioned above, the absence of sync from these channels prevents users from viewing a channel dedicated to another home.

The output of the RF modulators 114 are applied to the RF combiner 116, which acts an RF mixer to produce a broadband signal of the combined channels. The combined channels are then passed through a mixer/splitter 118 in the feeder inserter 46 (FIG. 5) and inserted onto the feeder cable 30 through a directional coupler 120 to passed down to the taps 34 and down the subscriber drops 36 to the homes.

Figure 7:
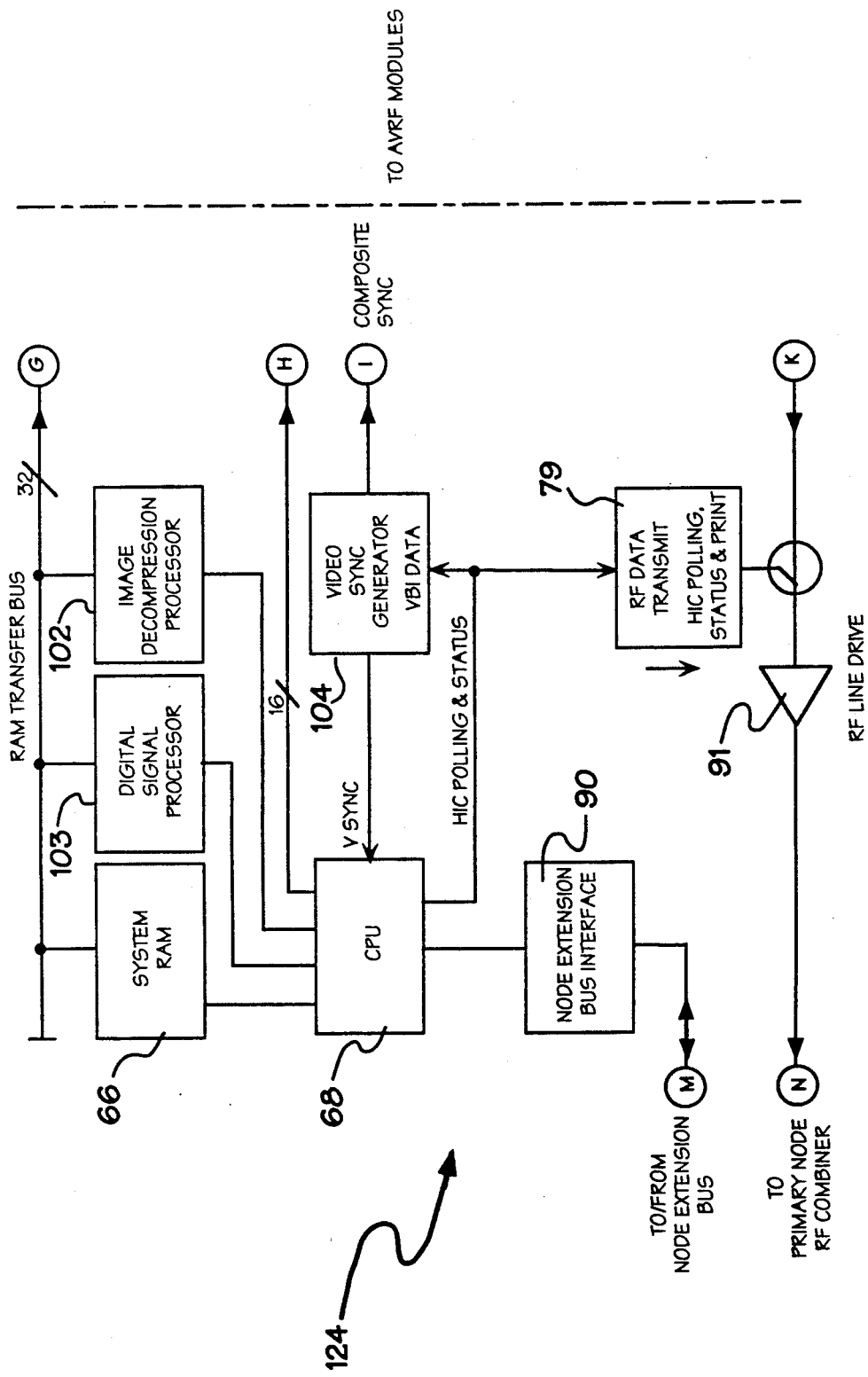
FIG. 7 is a schematic diagram of an extender module which is used to add more channels to a node.
Figure 8:
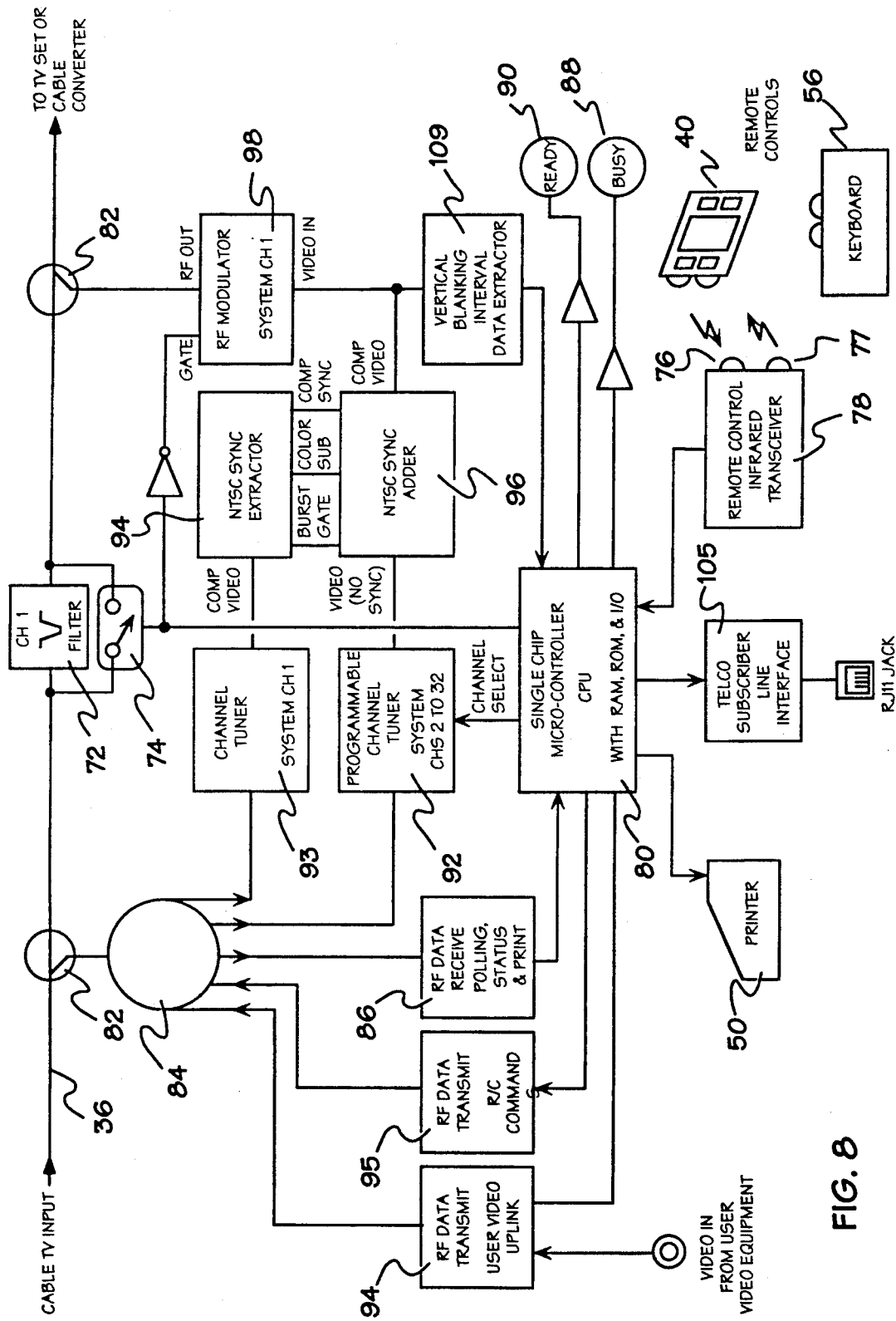
FIG. 8 is a schematic diagram of a home interface controller which interfaces between a node and a user's TV set.

The node extension interface control 122 is logic to couple the CPU 68 with a node extension module 124 (FIG. 7). The extension module 124 provides 16 additional interactive channels and is required for the full 32 channel (31 interactive) capability described above, since each CPU can only handle 16 channels. Ordinarily, 16 channels (15 interactive) can adequately handle 40 homes on a contention basis; however, 31 interactive channels are required in high density areas of the cable system such as apartment buildings. The output of the node extension module 124 connects to the RF combiner 116 of the primary node through directional coupler 126.

IX. ALTERNATIVE EMBODIMENTS

Figure 9:
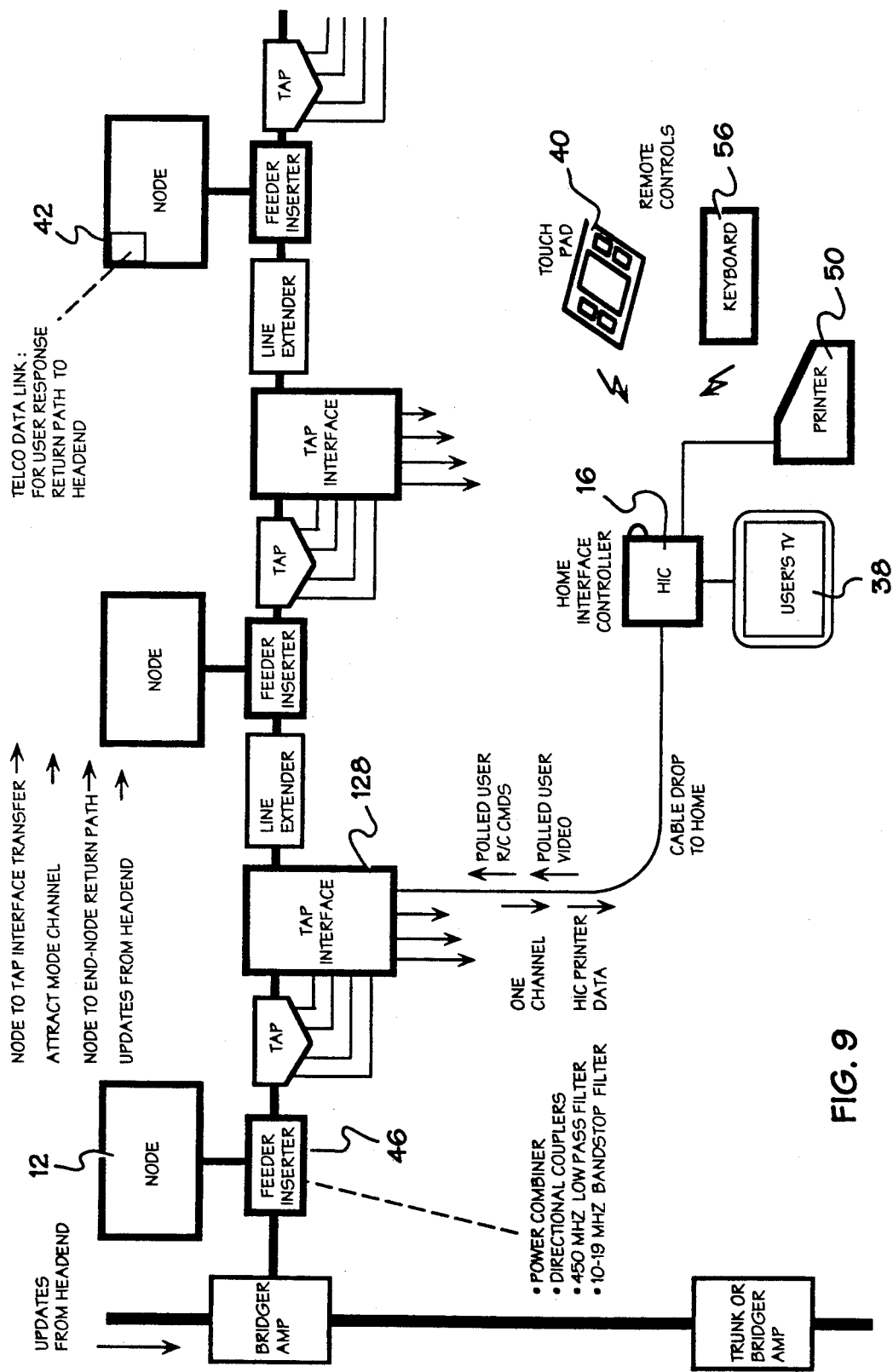
FIG. 9 is a diagram of a second embodiment of the invention in which a tap interface is used to reduce the amount of electronics in each home interface controller.
Figure 10:
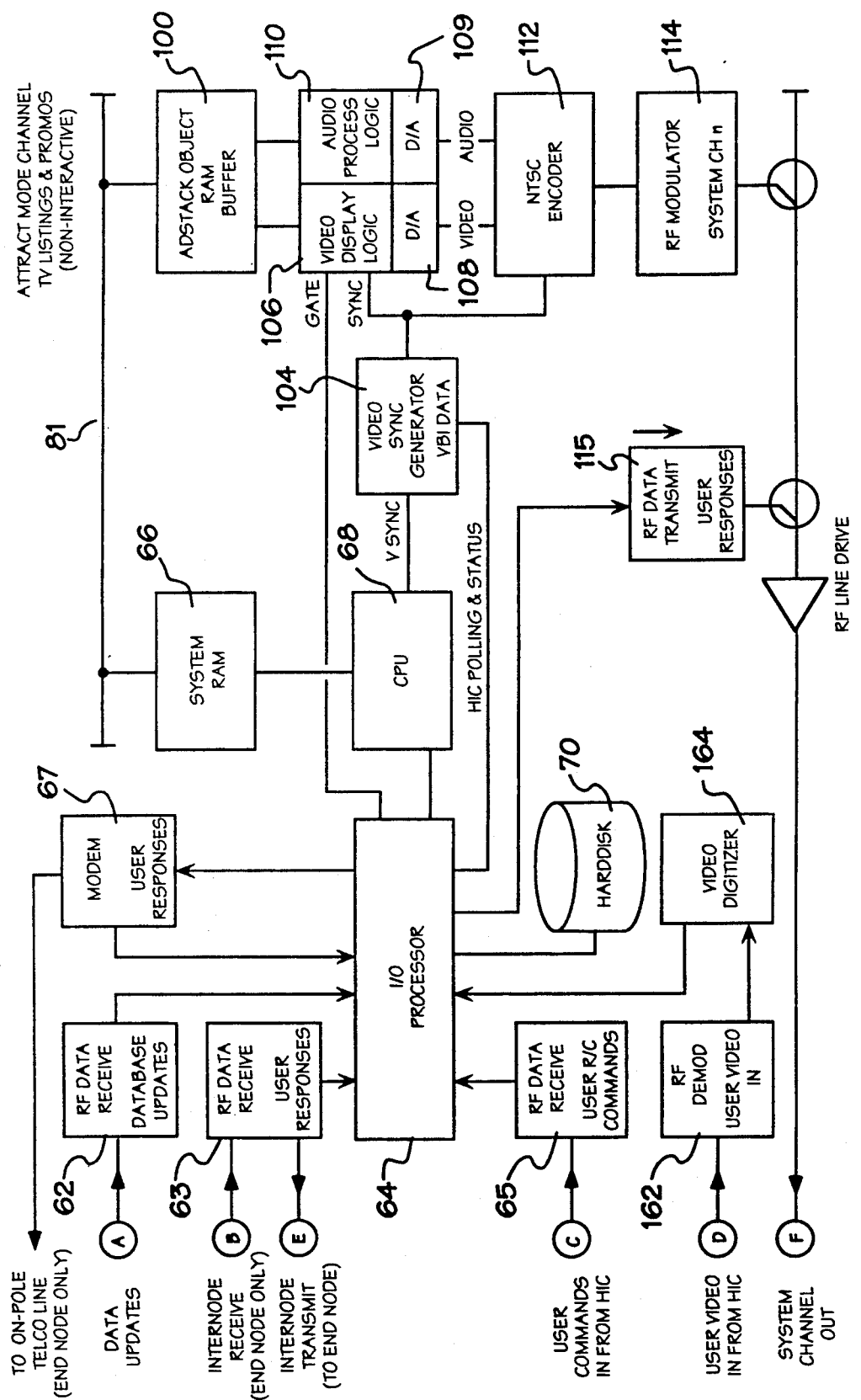
FIG. 10 is a schematic diagram of a node in a second embodiment of the invention.
Figure 11A:
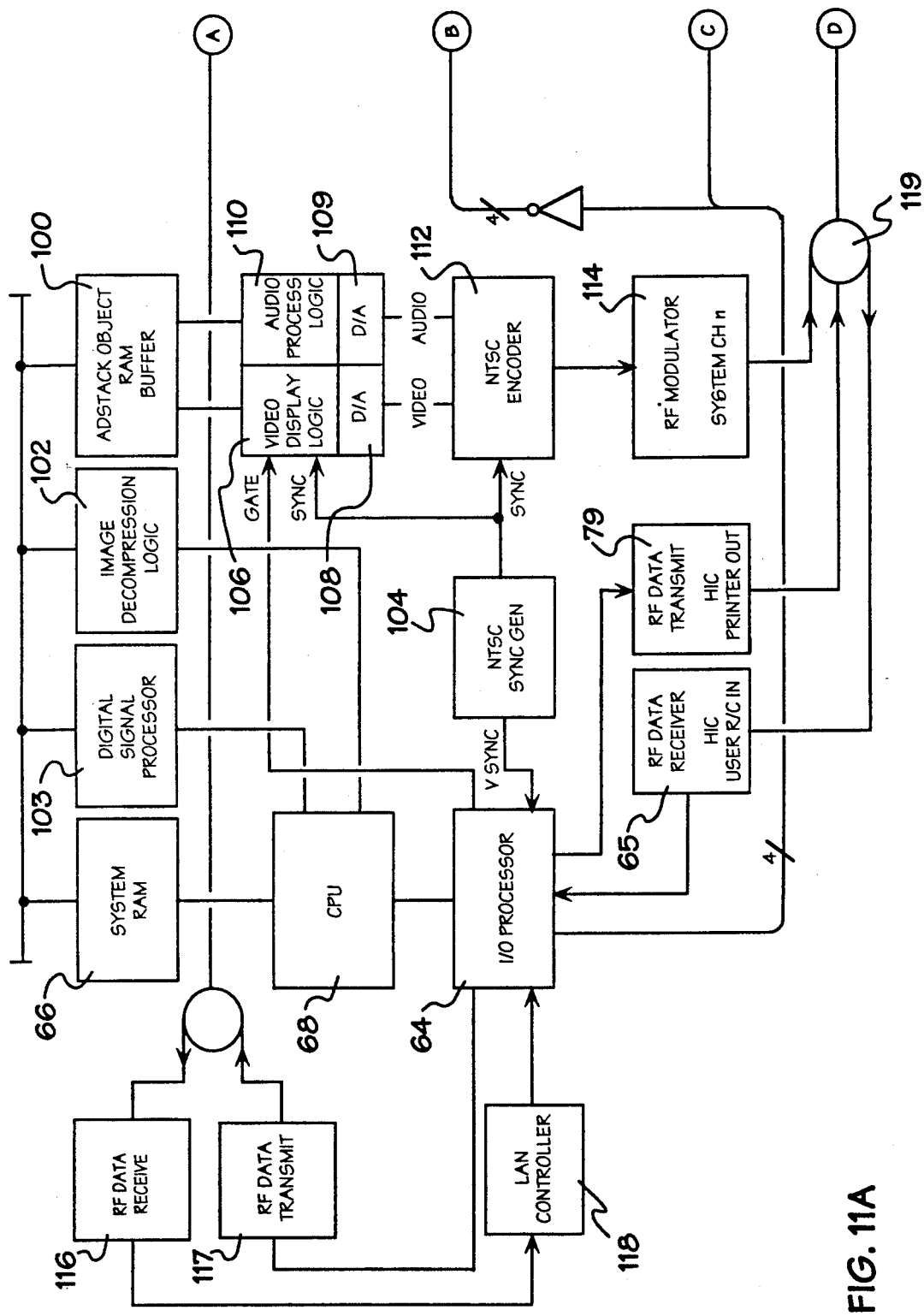
FIGS. 11A and 11B, collectively, represent a schematic diagram of the tap interface used in the second embodiment of the invention in a contention configuration.
Figure 11B:
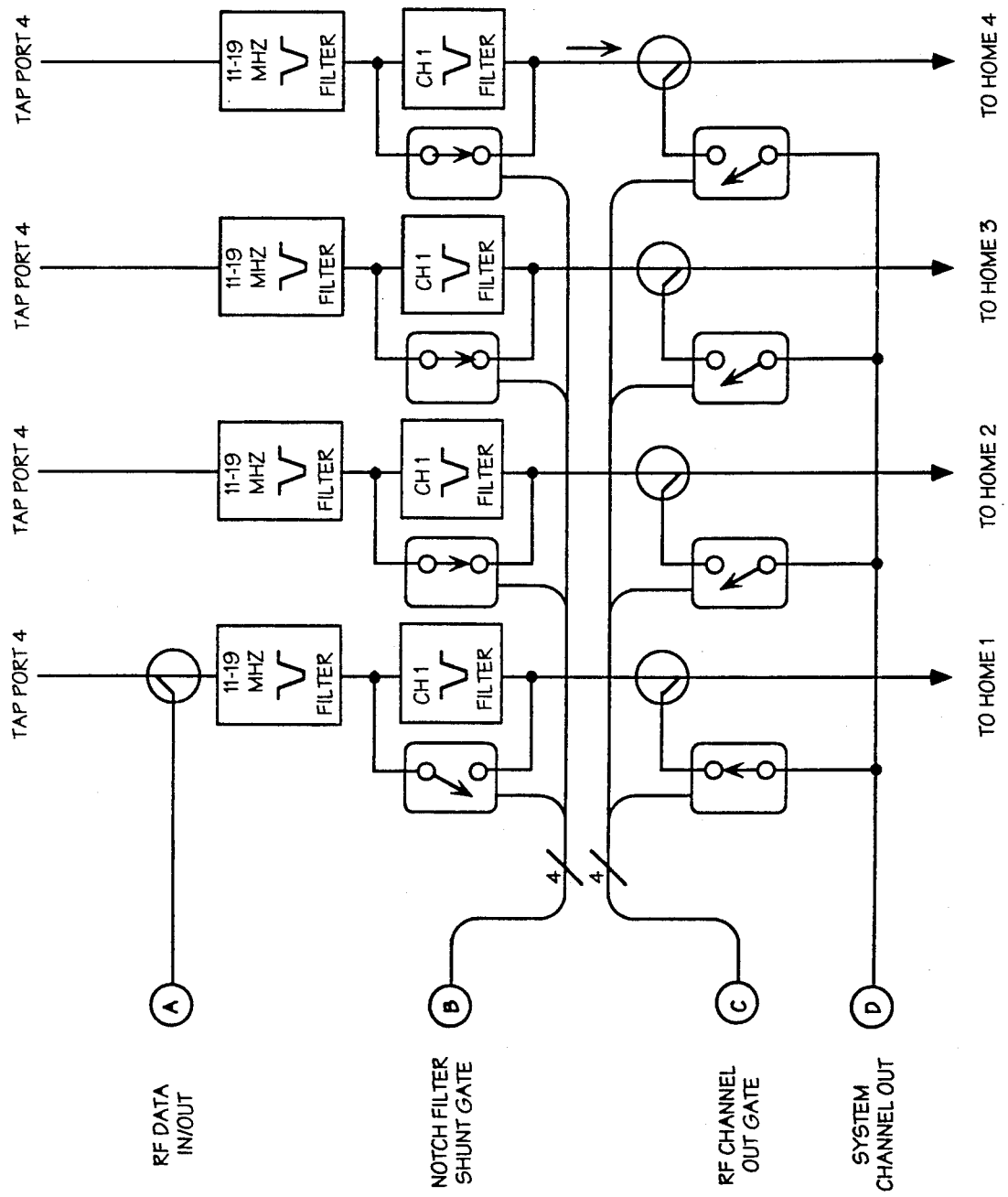

Various alternative embodiments of the present invention are possible. In one alternative embodiment shown in FIG. 9, much of the circuitry from HIC 16 is removed and transferred to the tap, specifically to a tap interface 128. FIG. 10 shows the node electronics for this embodiment of the invention. Only the attract mode channel electronics remain in the node 12; as shown in FIGS. 11A and 11B, the tap interface 128 now contains the electronics for the interactive channel, but there is only one such channel, and this channel must be shared on a contention basis between the four homes normally connected to the tap. Tap interface 128 also contains notch filters for connecting the single interactive channel to the first home that selects it, while the other homes remain connected to the non-interactive channel.

Figure 12:
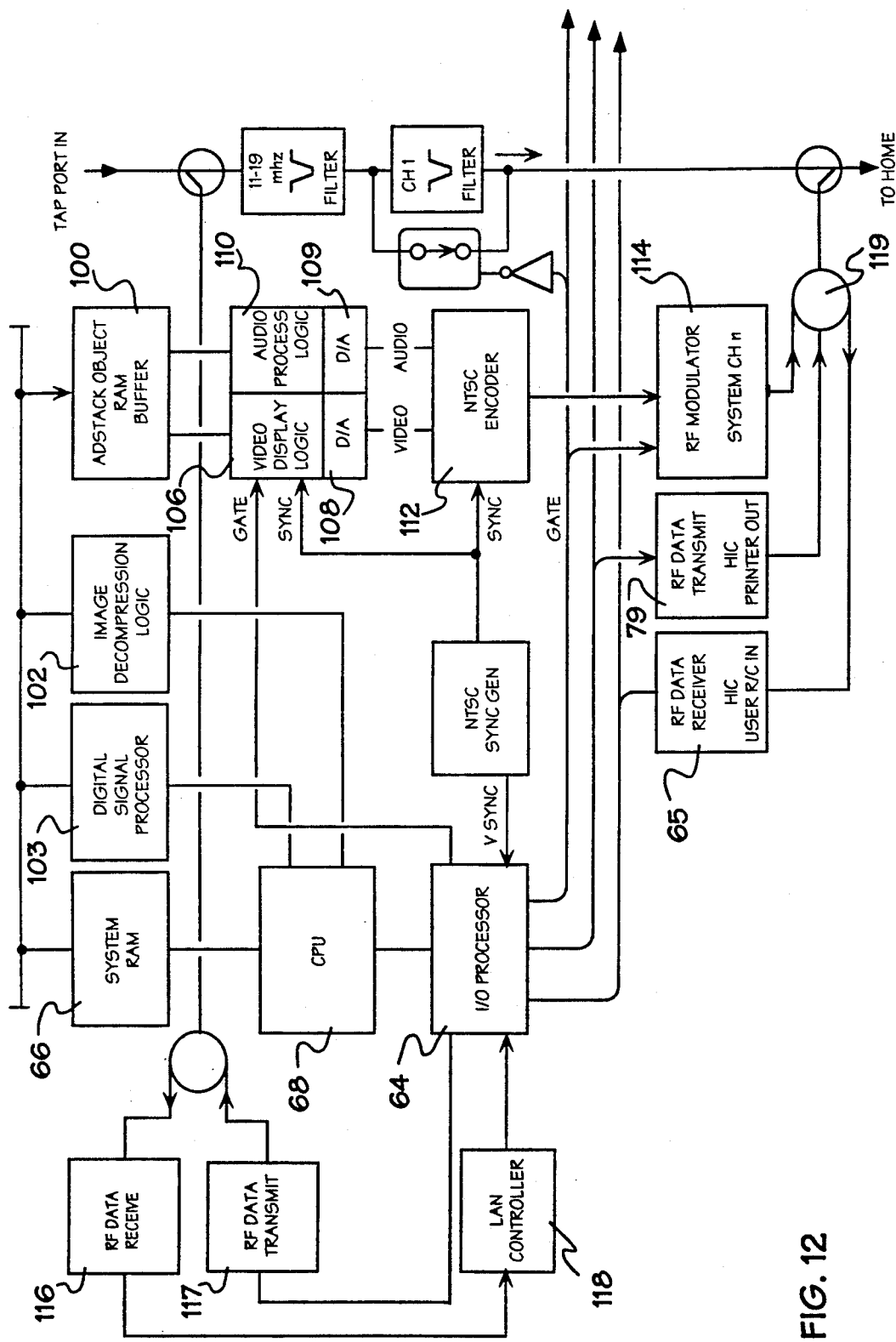
FIG. 12 is a schematic diagram of the tap interface used in the second embodiment of the invention in a non-contention configuration.

In a further embodiment of the invention shown in FIG. 12, tap interface 128 contains separate processing electronics for each of up to 60 homes connected to the taps associated with a node. In this embodiment, there is never any contention between homes for the data stored in the node. This should be contrasted with the first preferred embodiment of the invention, where there is some contention, but only up to 32 sets of processing electronics are required, one for each channel.

Figure 13:
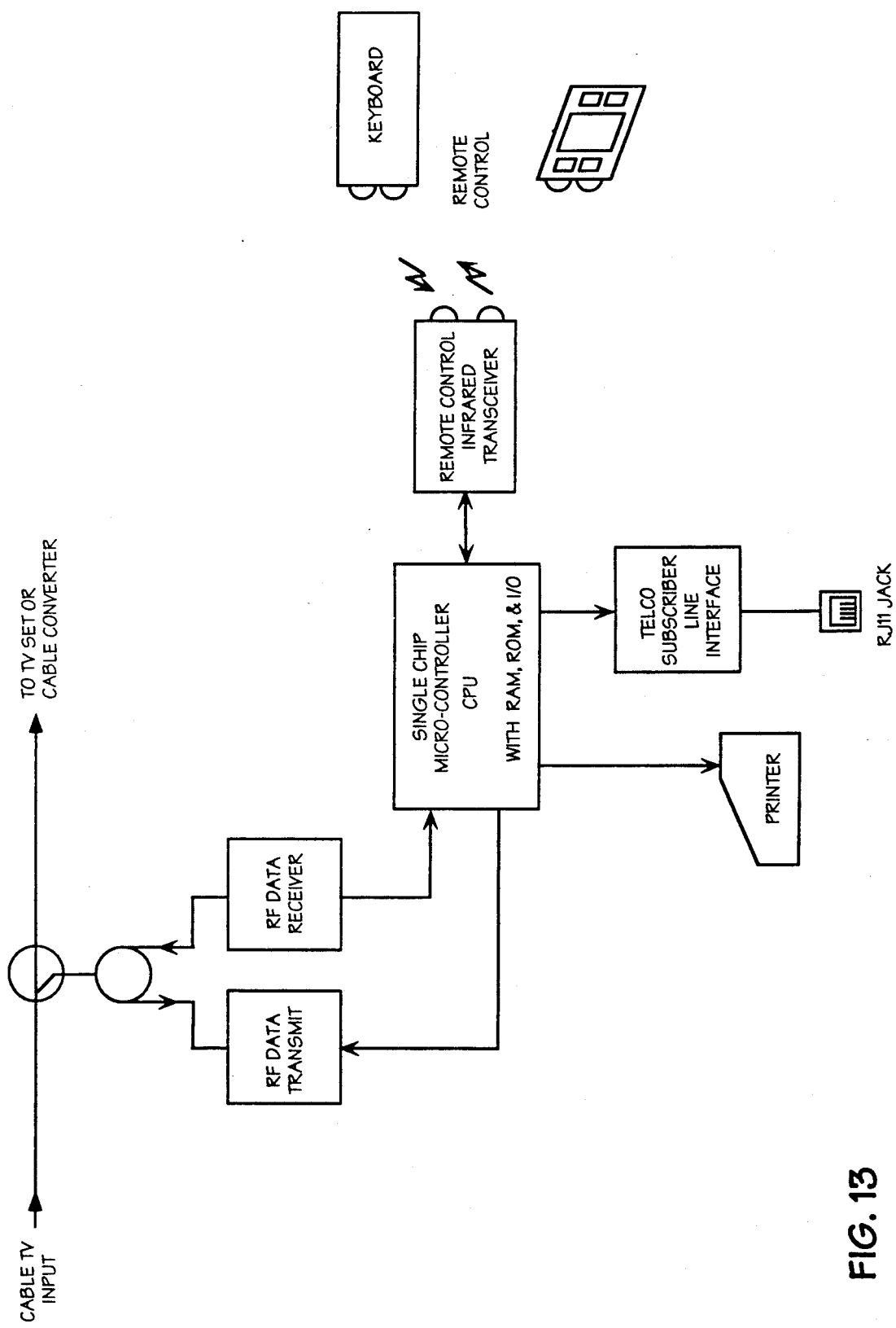
FIG. 13 is a schematic diagram of the simplified home interface controller used in the second embodiment of the invention.
Figure 14:
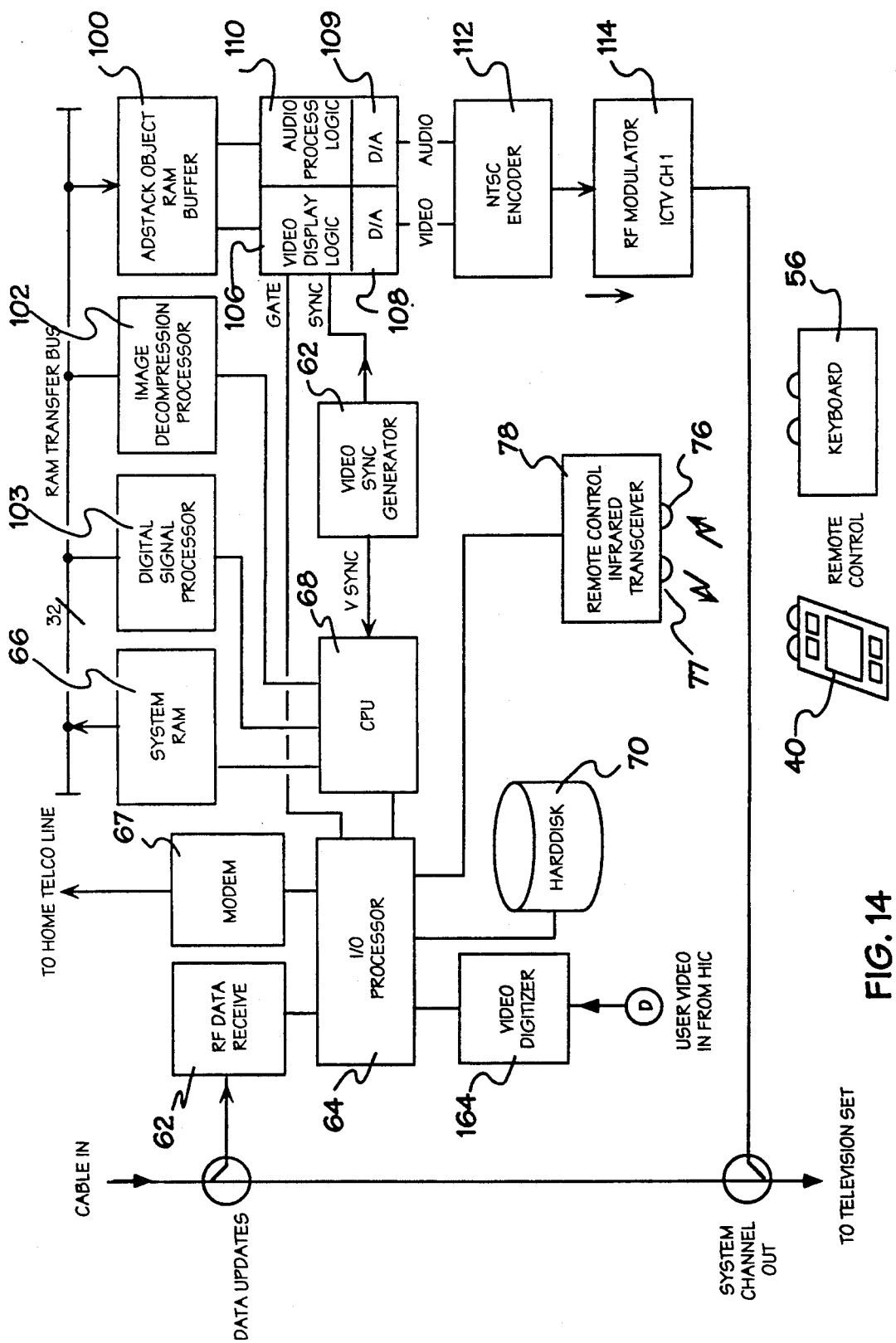
FIG. 14 is a schematic diagram of a still further embodiment of the invention in which all the node electronics are in the home interface controller of each user.

In yet still another embodiment of the present invention shown in FIG. 13, all of the node electronics is provided in the HIC 16 of each home. In this case, each HIC 16 would include essentially all of the electronics shown in FIG. 10 but, as in the embodiment of FIG. 12, there is no contention whatsoever between homes.

X. INFRARED REMOTE CONTROL

Figure 15:
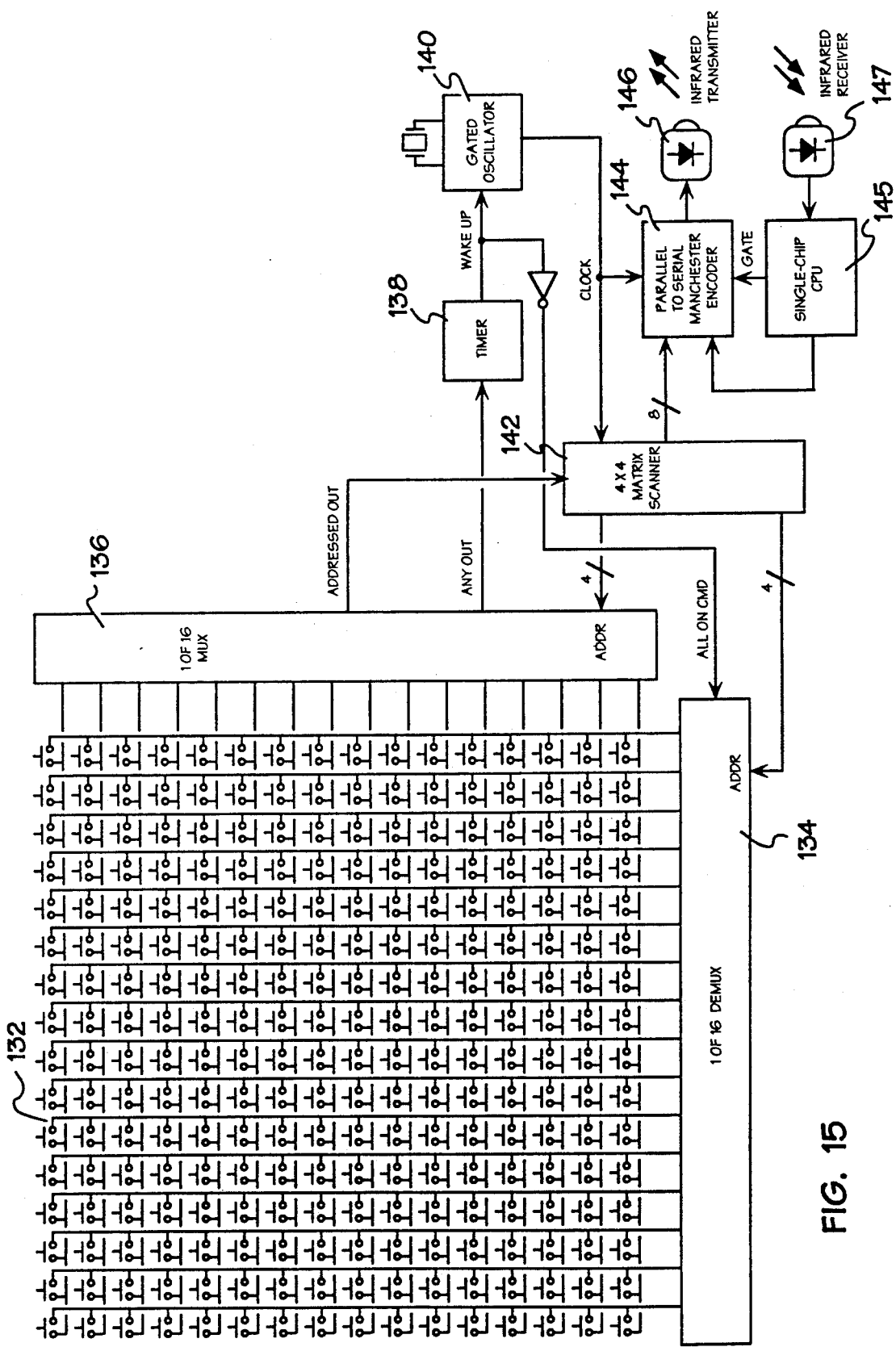
FIG. 15 is a schematic of the touch pad remote control device preferably used in the system of the present invention.

The infrared remote control device 40 preferably used in the present invention is shown in greater detail in FIG. 15. The touch pad area 52 of the device consists of a membrane switch array 132. In its inactive state, all outputs of 1 of 16 demux 134 are on, sensitizing all vertical columns of array 132. When the user touches any point on the array, the closure of a switch is detected by 1 of 16 mux 136, causing the output port labelled "ANY OUT" of 1 of 16 mux 136 to go high and thus activating timer 138. The high output from timer 138, in turn, activates gated oscillator 140 and deactivates the continuous "all on" state of 1 of 16 demux 134, initiating the scanning and reading of the columns and rows, respectively, of array 132, via 4×4 matrix counter/scanner 142. The switch closures detected by scanner 142 are encoded with a corresponding touch pad position (based upon the timing of the scanning) by parallel to serial Manchester encoder 144, and the encoded signal is sent to infrared transmitter 146.

Figure 19:
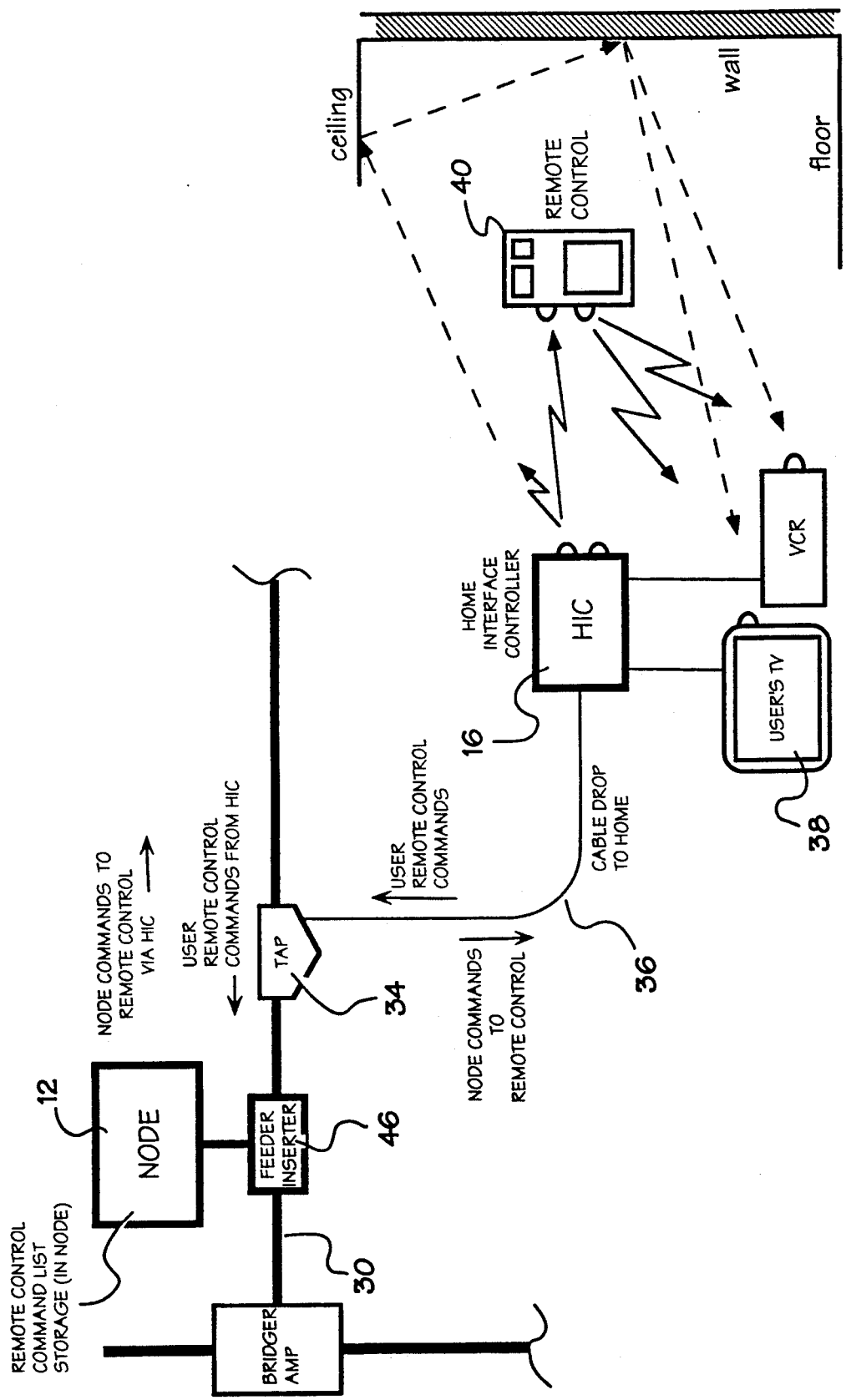
FIG. 19 shows the operation of the invention to remotely control electronic products in a subscriber's home.

Referring to FIG. 19, the infrared remote control device 40 is also adapted to receive infrared signals sent from an infrared transmitter 77 on remote control infrared transceiver 78 in HIC 16, and re-emit these received infrared signals to other electronic devices within range. Thus, for example, a user can program the node 12 (using on-screen commands via infrared remote control device 40) to turn on a TV or VCR to a preselected channel at a preselected time. The node 12, which has stored in its memory the individual infrared command signals for all popular electronic products, sends the appropriate command to HIC 16 at the preselected time, and the command is emitted from infrared transmitter 77 to infrared remote control device 40. An infrared receiver 147 on infrared remote control device 40 receives the command, a header on the command is recognized by CPU 145, and the CPU 145 causes the command to be re-transmitted by the infrared remote control device 40, via Manchester encoder 144 and infrared transmitter 146, to the TV or VCR to be activated. Alternatively, the HIC 16 can transmit directly to the device to be controlled by bouncing the command signal off a far wall or off any appropriate reflective surface which is properly oriented. In the above fashion, the present invention can be utilized as a universal remote control device.

XI. OPTIONAL FEATURES

Optionally, as shown in FIG. 16, the system of the present invention can be provided with an interface unit to allow the user to plug in a conventional PC keyboard 150, and thus enter alphanumeric commands directly without the use of IR remote control 40. The unit provided to the user includes a standard PC board connector, keyboard scan logic 152, a remote control modulator/driver 154 and an infrared diode transmitter 156.

Alternatively, users who do not have PC keyboards or who want a dedicated keyboard for use with the system can be provided with a special touch pad unit 40 which includes a full alpha-numeric membrane switch keyboard in addition to the touch pad area 52 shown in FIG. 15.

Another available option, shown in FIG. 17, is an interface to allow users to input video for classified ads to be transmitted over the system. This unit consists of a receptacle 158 for inputting video from a camcorder or VCR and a video to RF modulator 160 in the HIC 16 of the user. An RF to video demodulator 162 and a video digitizer 164 are provided in the node 12 to demodulate and digitize the video data, which is then forwarded to the regional processing center in the manner described previously.

A still further option, shown in FIG. 18, is an autodialer provided in HIC 16 to automatically dial up a merchant or classified advertiser from the screen to allow the user to speak directly by telephone, to the seller. A CPU 166, through a telephone company subscriber line interface 168, automatically places the call for the user.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An interactive television information system for transmitting video picture information to home televisions coupled to a cable television distribution system, comprising:

a regional processing center for assembling and processing said video picture information to be transmitted over said cable distribution system;

a headend for distributing cable television programming to subscribers of said cable distribution system; and at least one node coupled to said cable television distribution system for capturing and storing said processed and assembled video picture information, said video picture information including both still frame and full-motion video information, said node being associated with only a portion of said home televisions associated with said headend;

wherein a cable television subscriber viewing one of said home televisions can display and interact with said video picture information stored in said associated node by communicating to said node, each of said nodes in said cable television distribution system containing a complete copy of said video picture information which said subscriber associated with said node can display and interact with, such that said subscriber interacts directly with said video picture information stored in said node, without accessing said video picture information stored in said regional processing center.

2. An interactive television information system as recited in claim 1, wherein each of said nodes is coupled to feeder cable of said cable television distribution system immediately upstream of taps on said feeder cable for connecting said home televisions associated with said node.

3. An interactive television information system as recited in claim 2, wherein said nodes include means for transmitting said video picture information to said home televisions at video frequencies unused by the cable distribution system for transmitting ordinary cable television programming.

4. An interactive television information system as recited in claim 3, wherein inserter means are used to couple said nodes to said feeder cable, said inserter means including a low pass filter for blocking said video picture information from any nodes disposed upstream, while permitting said video frequencies used by said cable system for ordinary cable television programming to pass through downstream unattenuated.

5. An interactive television information system as recited in claim 3, wherein said nodes include means for outputting said video picture information to said associated home televisions over a plurality of channels.

6. An interactive television information system as recited in claim 5, wherein said home televisions each include an associated home interface controller with means for receiving one of said plurality of channels on a contention basis, said home interface controller, upon activation, being assigned a channel not in use by any other home interface controller associated with said node, said video picture information being transmitted from said node to said home interface controller over said assigned channel.

7. An interactive television information system as recited in claim 5, wherein said home televisions each include an associated home interface controller with means for receiving one of said plurality of channels on a non-contention basis.

8. An interactive television information system as recited in claim 6, wherein said home interface controllers include means for preventing the reception of channels already assigned to another of said home televisions associated with the same node.

9. An interactive television information system as recited in claim 3, further comprising means in said nodes and in said home interface controllers for communicating said commands from said users back to said nodes.

10. An interactive television information system as recited in claim 9, further comprising an infrared remote control touch pad device associated with said home interface controllers for inputting user commands.

11. An interactive television information system as recited in claim 9, wherein said home interface controllers are adapted to receive said user commands from a keyboard.

12. An interactive television information system as recited in claim 9, further comprising means associated with said home interface controllers for printing information received from said associated node.

13. An interactive television information system as recited in claim 9, further comprising means for transmitting user responses to a selected merchant.

14. An interactive television information system as recited in claim 9, further comprising an autodialer device in said home interface controller for dialing-up a selected advertiser.

15. An interactive television information system as recited in claim 9, further comprising means in said home interface controller for accepting user generated video and sending said user generated video to said node for processing.

16. An interactive television information system as recited in claim 1, wherein said cable distribution system has a head end, and a computer is provided in said head end for storing and forwarding said information passing between said regional processing center and said nodes.

17. An interactive television information system as recited in claim 10, wherein said infrared remote control touch pad device is adapted to receive infrared commands sent from said home interface controller, and output infrared commands to control electronic products within range of said remote control device.

18. A method for transmitting interactive video picture information to home televisions coupled to a cable distribution system, said method comprising the steps of:
 (a) processing and assembling information in a regional processing center;
 (b) transmitting said processed and assembled information from said regional processing center to a plurality of nodes in said cable television distribution system, said information including both still frame and full-motion video information, each of said nodes being associated with only a portion of said home televisions associated with a headend, said headend serving to distribute cable television programming to subscribers of said cable television system; and
 (c) transmitting said video picture information stored in a node to a home television associated with said node in response to commands received from a subscriber of said cable television distribution system, said node containing a complete copy of the information which said subscriber can display and interact with, such that said subscriber interacts directly with said video picture information stored in said associated node, without accessing said video picture information stored in said regional processing center.

19. A method for transmitting interactive video picture information as recited in claim 18, wherein said video picture information is transmitted from said nodes to said home televisions at video frequencies unused by the cable distribution system for transmitting ordinary cable television programming.

20. A method for transmitting interactive video picture information as recited in claim 18, wherein said video picture information is transmitted from said nodes to said associated home televisions over a plurality of channels.

21. A method for transmitting interactive information as recited in claim 20, wherein said home televisions each include a home interface controller for receiving one of said plurality of channels on a contention basis, said home interface controller, upon activation being assigned a channel not in use by any other home interface controller associated with said node, said video picture information being transmitted from said node to home interface controller over said assigned channel.

22. A method for transmitting interactive video picture information as recited in claim 20, further comprising the step of printing out, on a printer adjacent said home television, information received from an associated node in response to a user command.

23. A method for transmitting interactive video picture information as recited in claim 18, further comprising the step of transmitting user responses to a selected merchant.

24. A method for transmitting interactive video picture information as recited in claim 18, further comprising the steps of storing information in said node for controlling a device in the home of said subscriber and transmitting said stored information from said node to a home interface controller in the home of said subscriber for controlling said device in accordance with said stored information.

* * * * *